US012673227B2

(12) United States Patent
Alsaqri et al.

(10) Patent No.: US 12,673,227 B2
(45) Date of Patent: Jul. 7, 2026

(54) MOBILE RAIL-MOUNTED FIRE EXTINGUISHING ROBOT

(71) Applicant: Saudi Electricity Company, Riyadh (SA)

(72) Inventors: Majed Mohammed M. Alsaqri, Jeddah (SA); Adeeb Lafi Alharbi, Al Madinah Al Munawwarah (SA); Ibrahim Ali Almohaisin, Riyadh (SA); Yusof Suliman Alwashmi, Riyadh (SA); Saab Bader Altamimi, Riyadh (SA)

(73) Assignee: SAUDI ELECTRICITY COMPANY, Riyadh (SA)

( * ) Notice: Subject to any disclaimer, the term of this patent is extended or adjusted under 35 U.S.C. 154(b) by 0 days.

(21) Appl. No.: 19/415,055

(22) Filed: Dec. 10, 2025

(65) Prior Publication Data

US 2026/0158311 A1 Jun. 11, 2026

(30) Foreign Application Priority Data

Dec. 11, 2024 (SA) ................................ 1020247327

(51) Int. Cl.

| | |
|---|---|
| ***A62C 35/68*** | (2006.01) |
| ***A62C 3/02*** | (2006.01) |
| ***A62C 3/16*** | (2006.01) |
| ***A62C 37/36*** | (2006.01) |

(52) U.S. Cl.

CPC ................ *A62C 35/68* (2013.01); *A62C 3/02* (2013.01); *A62C 3/16* (2013.01); *A62C 37/04* (2013.01); *A62C 37/36* (2013.01)

(58) Field of Classification Search

CPC ......... A62C 3/002; A62C 3/02; A62C 3/0221; A62C 3/16; A62C 35/68; A62C 37/04; A62C 37/36

USPC ...... 169/16, 47, 52, 54, 55, 62, 70; 239/722, 239/750, 751

See application file for complete search history.

(56) References Cited

U.S. PATENT DOCUMENTS

| | | | | |
|---|---|---|---|---|
| 6,834,728 | B2 * | 12/2004 | Demole | A62C 3/0221 169/54 |
| 11,701,531 | B2 * | 7/2023 | Clarke | B65G 1/0464 169/47 |
| 12,145,011 | B2 * | 11/2024 | Austrheim | A62C 3/002 |
| 2007/0210192 | A1 * | 9/2007 | Piatti | A62C 3/0221 169/70 |

(Continued)

*Primary Examiner* — Steven J Ganey

(74) *Attorney, Agent, or Firm* — MH2 Technology Law Group, LLP

(57) ABSTRACT

The present disclosure provides a mobile fire-extinguishing robot comprising a housing with internal rack structure. An electric motor connects to a driving wheel, with two driven wheels at the housing bottom, supported by rail tracks. A controller at the housing top operates with a thermal imaging camera using artificial intelligence for fire pattern analysis and wind direction sensor. At least one spray nozzle positions on the housing side with steering motor connected to the controller. A fire pump inside connects to a T-shaped extinguishing hose containing an iron chip at its bottom. An electromagnetic coil opposite the iron chip connects to the controller. A return spring maintains the hose in ascending position. An electric valve interfaces with the hose when the electromagnetic coil attracts the iron chip, with extinguishing materials supply pipe connecting to the valve.

20 Claims, 4 Drawing Sheets

(56) References Cited

U.S. PATENT DOCUMENTS

2025/0332460 A1* 10/2025 Yu .......................... A62C 31/28

* cited by examiner

MOBILE RAIL-MOUNTED FIRE EXTINGUISHING ROBOT

FIELD OF INVENTION

The present disclosure relates to fire suppression systems, and more particularly to a mobile rail-mounted autonomous fire extinguishing robot that uses artificial intelligence to detect, analyze, and extinguish fires in open and extended locations such as electrical distribution stations, transmission facilities, and warehouses.

BACKGROUND

Fire suppression systems play a fundamental role in protecting facilities, equipment, and personnel from fire hazards. Traditional fire suppression systems typically employ overhead sprinkler networks that activate when fire conditions are detected, distributing water or other extinguishing agents across broad areas. While these systems have proven effective in many applications, they present limitations in certain environments, particularly in open and extended locations such as electrical substations, transmission facilities, warehouses, and industrial complexes. The limitations of overhead fire suppression systems may be particularly pronounced in electrical distribution stations, transmission facilities, and isolated generation facilities where equipment is distributed across open areas and ceiling-mounted systems may be impractical or ineffective. In such environments, flames rising upward may damage overhead suppression system components before effective fire suppression can be achieved, and the fixed positioning of overhead systems may prevent targeted response to fires occurring at specific equipment locations.

Conventional overhead fire suppression systems often lack precision in targeting specific fire locations, resulting in widespread distribution of extinguishing materials that may cause collateral damage to sensitive equipment or stored goods. In electrical facilities, for example, water-based suppression can damage electrical components and create safety hazards. Additionally, traditional systems typically operate with limited intelligence, activating based on simple threshold triggers without analyzing fire characteristics, environmental conditions, or the specific nature of the hazard.

The detection and suppression of fires in large, open spaces presents particular challenges. These environments may contain diverse types of equipment and materials that require different extinguishing approaches. Electrical fires, oil-based fires, and ordinary combustible fires each respond differently to various suppression agents, yet conventional systems typically deploy a single type of extinguishing material regardless of fire type.

Recent developments in robotics and artificial intelligence have opened new possibilities for fire suppression applications. Robotic systems can potentially provide more targeted and intelligent fire response capabilities, analyzing fire conditions and selecting appropriate suppression strategies. However, existing robotic fire suppression solutions often face limitations in mobility, positioning accuracy, and the ability to operate autonomously in complex environments. Some prior art robotic fire suppression systems have attempted to address these limitations through portable robots that can be deployed into fire environments. However, these systems typically require the robot to enter directly into high-temperature fire zones, necessitating continuous cooling of internal components and limiting operational duration. Such systems often lack the ability to distinguish between different fire types, move quickly to fire locations along predetermined paths, or provide multiple extinguishing material options. Additionally, these prior art systems typically respond only after fires have occurred rather than providing predictive monitoring capabilities that could detect developing fire conditions before ignition.

There remains a need for fire suppression systems that can provide precise, intelligent fire detection and suppression capabilities in open and extended locations while minimizing collateral damage and adapting to different types of fire hazards. Such systems would benefit from the ability to analyze fire conditions, select appropriate extinguishing materials, and position suppression equipment with accuracy. Additionally, such systems would benefit from rail-mounted mobility that enables rapid response along predetermined paths, continuous round-the-clock monitoring capabilities, and predictive analysis that can identify developing fire conditions before ignition occurs. An alternative approach to ceiling-mounted systems that positions fire suppression equipment at equipment level along predetermined routes would address many of the limitations of conventional overhead systems.

SUMMARY

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

According to an aspect of the present disclosure, a robot for extinguishing fires in open and extended locations is provided. The robot comprises a housing; a rack structure positioned within the housing and extending outside the housing; an electric motor positioned inside the housing; a driving wheel connected to the electric motor; two driven wheels positioned at the housing; an upper rail track and a lower rail track configured to support the driving wheel and the driven wheels respectively; a controller; a thermal imaging camera operatively coupled to the controller and configured to analyze fire patterns using artificial intelligence; a wind direction sensor; at least one spray nozzle; at least one steering motor connected to the at least one spray nozzle and operatively coupled to the controller; at least one fire pump positioned inside the housing; at least one lower extinguishing hose connected to the at least one fire pump; a metal chip (preferably an iron chip) installed in the at least one lower extinguishing hose; an electromagnetic coil positioned to attract the iron chip and operatively coupled to the controller; a return spring associated with the at least one lower extinguishing hose to maintain the hose in a retracted position; an electric valve configured to interface with the at least one lower extinguishing hose when the electromagnetic coil attracts the iron chip; an electrical communication port positioned at a connection interface between the at least one lower extinguishing hose and the electric valve; and an extinguishing materials supply pipe connected to the electric valve.

The present disclosure addresses limitations in prior art fire suppression systems by providing a mobile rail-mounted autonomous fire extinguishing robot with integrated systems that achieve compatibility between components to enable coordinated fire detection, analysis, and suppression operations. The robot may provide continuous round-the-clock monitoring of open and extended locations, enabling hazard detection when fire conditions develop and rapid response to extinguish fires before they escalate. The integration between the robot's systems, including thermal imaging analysis, artificial intelligence-based fire classification, autonomous navigation, and material selection capabilities, may achieve accuracy in determining the appropriate type and material for fire suppression based on real-time analysis of fire characteristics and environmental conditions. The robot may be suspended from a rail-mounted infrastructure that positions the fire suppression equipment at equipment level rather than overhead, enabling targeted response to fires occurring at specific locations within the monitored area.

According to another aspect of the present disclosure, a method for operating a robot for extinguishing fires in open and extended locations is provided. The method comprises detecting a fire hazard using fire sensors deployed at a location; sending a call signal from the fire sensors to a robot positioned on a rail track system; moving the robot along the rail track system to a fire location using an electric motor and driving wheel; analyzing fire patterns and environmental conditions using a thermal imaging camera with artificial intelligence capabilities; determining a type of fire and selecting an appropriate extinguishing material based on the analysis; activating an electromagnetic coil to attract an iron chip in a selected lower extinguishing hose, causing the hose to move downward and connect with an electric valve; supplying electrical power to the electric valve through an electrical communication port to open the valve; pumping extinguishing material from an extinguishing materials supply pipe through the electric valve to at least one fire pump; directing the extinguishing material to at least one spray nozzle using the at least one fire pump; and controlling a direction of the at least one spray nozzle using at least one steering motor to target the fire location.

According to another aspect of the present disclosure, a rail-mounted fire suppression system for extended locations is provided. The system comprises a pipe rack having an L-shaped profile and configured to support rail tracks and extinguishing material supply infrastructure; an upper rail track and a lower rail track mounted on the pipe rack; a robot configured to travel on the upper rail track and the lower rail track; multiple fire sensors distributed along the pipe rack and configured to detect fire conditions; multiple electric valves positioned at intervals along an extinguishing materials supply pipe mounted on the pipe rack; a main supply track extending along a length of the pipe rack and configured to provide continuous electrical power; flexible moving contact heads on the robot configured to maintain electrical contact with the main supply track during movement; a controller on the robot configured to coordinate fire detection, analysis, and suppression operations using artificial intelligence; and a thermal imaging camera on the robot configured to analyze fire characteristics and determine appropriate suppression strategies.

The foregoing general description of the illustrative embodiments and the following detailed description thereof are merely exemplary aspects of the teachings of this disclosure and are not restrictive.

BRIEF DESCRIPTION OF FIGURES

The accompanying drawings, which are incorporated in and constitute a part of this specification, illustrate various embodiments of the present disclosure and together with the description, serve to explain the principles of the disclosure.

DETAILED DESCRIPTION

The following description sets forth exemplary aspects of the present disclosure. It should be recognized, however, that such description is not intended as a limitation on the scope of the present disclosure. Rather, the description also encompasses combinations and modifications to those exemplary aspects described herein.

Figure 1:
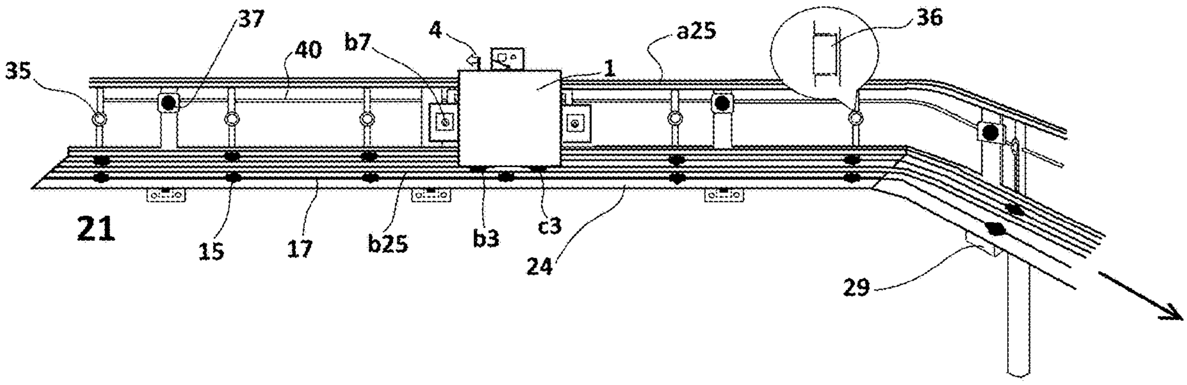
FIG. 1 illustrates a view of a fire extinguishing robot system installed along a rail track, according to aspects of the present disclosure.

Referring to FIG. 1, a fire extinguishing robot system may be configured for deployment in open and extended locations such as electrical distribution stations, isolated generation facilities, warehouses, and control rooms. The system may comprise a robot 1 positioned on a rail system that enables controlled movement along predetermined paths throughout the monitored area. The robot 1 may comprise a housing that may be detachable and re-installable, optionally configured as a cube-shaped box made of metal, plastic, or reinforced carbon fiber. The robot 1 may travel on an upper rail track a25 and a lower rail track b25, which may be mounted on a pipe rack 24. The pipe rack 24 may be supported by wall brackets 29 that secure the system to existing wall structures within the facility.

The robot 1 may include a wind direction sensor 4 positioned at the top of the device to monitor environmental conditions that may affect fire suppression operations. The robot 1 may also include an electric motor 2 positioned inside the housing and connected to a driving wheel a3 from the rear to control movement. In some embodiments, the robot 1 may further comprise two driven wheels, specifically driven wheel b3 and driven wheel c3, which may be free to move forward and backward according to the movement of the driving wheel a3 and may engage with the rail tracks to provide mobility along the predetermined path. A spray nozzle b7 may extend from the side of the robot 1 housing to direct extinguishing materials toward fire locations.

As shown in FIG. 1, an extinguishing materials supply pipe 17 may run parallel to the rail track system and may be mounted on the pipe rack 24. The extinguishing materials supply pipe 17 may be connected to tanks containing various fire suppression materials and may supply these materials to the robot 1 during fire suppression operations. An electric valve 15 may be positioned at intervals along the extinguishing materials supply pipe 17, allowing the robot 1 to connect to different supply points as needed based on the type of fire detected and the appropriate extinguishing material required. In some embodiments, the electric valves 15 may operate with screw actuators similar to solenoid valves and may be manufactured with specifications corresponding to the sizes of lower extinguishing hoses.

In some embodiments, multiple extinguishing materials supply pipes 17 (e.g. a plurality of extinguishing materials supply pipes, each connected to one or more electric valves) may run parallel to the rail track system, with each supply pipe configured to transport a different type of extinguishing material. A first supply pipe may be configured to supply water-based extinguishing agents, a second supply pipe may be configured to supply foam-based agents, a third supply pipe may be configured to supply gaseous suppression agents, and a fourth supply pipe may be configured to supply dry chemical powder agents. Each supply pipe may be constructed from materials and with specifications appropriate for the chemical and physical properties of the particular extinguishing agent that the pipe transports. The multiple supply pipe configuration may enable the robot 1 to select from various extinguishing material options based on the type of fire detected, providing targeted fire suppression capabilities that adapt to different fire classifications.

The system may include multiple fire sensors 37 distributed at various locations along the rail track system to provide comprehensive fire detection coverage throughout the monitored area. The fire sensors 37 may comprise flame probes, miniature thermal cameras, smoke sensors, or temperature sensors, depending on the specific detection requirements of the installation environment. The number of fire sensors 37 may be determined or increased according to the area of the location and the need to cover all corners and destinations within the monitored space. In some embodiments, the fire sensors 37 may be wired or wirelessly connected with the robot 1 and may send call signals to the robot 1 when a hazard occurs.

With continued reference to FIG. 1, stop sensors 36 may be positioned at specific locations along the track to control the precise stopping position of the robot 1 at designated coordinates. The stop sensors 36 may be positioned at locations that correspond to the positions of the electric valves 15 along the extinguishing materials supply pipe 17. Each stop sensor may comprise a ferromagnetic member, which may be an stop sensor 36, that may be positioned within the stop sensor housing. The ferromagnetic member may be configured to respond to electromagnetic attraction forces generated by components on the robot 1. A rear electromagnetic coil 21 may be located at the rear portion of the robot 1 and may be operatively coupled to the controller 5. The rear electromagnetic coil 21 may be positioned to interact with the stop sensors 36 to achieve precise stopping at the electric valve 15 locations. The rear electromagnetic coil 21 may receive control signals from the controller 5 that determine when electromagnetic attraction should be activated to engage with the ferromagnetic members within the stop sensors.

When the robot 1 approaches a target stopping position, the controller 5 may detect the proximity to a stop sensor based on position data, sensor signals, or predetermined coordinate information stored in the controller 5 memory. Upon detecting that the robot 1 is approaching a stop sensor location, the controller 5 may send a command to reduce the speed of the electric motor 2, causing the robot 1 to decelerate as it approaches the target stopping position. The controlled deceleration may enable more precise positioning and may prevent the robot 1 from overshooting the desired stopping location.

As the robot 1 continues to approach the stop sensor, the controller 5 may activate the rear electromagnetic coil 21 by supplying electrical current to the coil windings. The energized rear electromagnetic coil 21 may generate a magnetic field that may attract the ferromagnetic member within the stop sensor. The magnetic attraction force between the rear electromagnetic coil 21 and the ferromagnetic member may create a pulling force that may assist in stopping the robot 1 at the precise location. In some embodiments, the magnetic attraction may cause the ferromagnetic member to move toward the rear electromagnetic coil 21, and this movement may trigger a mechanical or electrical mechanism within the stop sensor that signals the controller 5 to halt the electric motor 2. The rear electromagnetic coil 21 may attract the stop sensor 36 inside the stop sensor, and the attraction of the stop sensor 36 to the rear electromagnetic coil 21 may cause the electric motor 2 to stop, resulting in the robot 1 stopping at the precise location. In some embodiments, the attraction of the ferromagnetic member may open an electrical circuit that interrupts power to the electric motor 2, causing immediate cessation of movement. In other embodiments, the attraction may generate a stop signal that the controller 5 receives and processes to send a halt command to the electric motor 2.

The position of each stop sensor may be permanently associated with the position of a corresponding electric valve 15. This permanent association may ensure that when the robot 1 stops at a stop sensor location, the robot 1 is positioned with the appropriate lower extinguishing hose aligned with the corresponding electric valve 15. The precise positioning achieved through the rear electromagnetic coil 21 and stop sensor interaction may enable reliable connection between the lower extinguishing hose and the electric valve 15, ensuring proper fluid coupling and electrical communication port engagement.

The stop sensor system may prevent the robot 1 from stopping at incorrect locations that would misalign the lower extinguishing hose with the electric valve 15. The electromagnetic attraction mechanism may provide positioning accuracy that may be superior to purely distance-based or time-based stopping methods, as the physical attraction between the rear electromagnetic coil 21 and the ferromagnetic member may create a definite stopping point that may be repeatable across multiple stopping cycles.

With continued reference to FIG. 1, stop sensors 36 may be positioned at specific locations along the track to control the precise stopping position of the robot 1 at designated coordinates. A rear electrical coil 21 may be located at the rear portion of the robot 1 and may interact with the stop sensors 36 to achieve precise stopping at the electric valve 15 locations. The rear electrical coil 21 may be controlled by a controller and may attract a free stop sensor 36 inside the stop sensor when the desired electric valve position is approached, causing the robot 1 to travel slowly and then stop precisely. The locations and number of electric valves 15 may be determined and increased based on the conditions of the location, allowing for customized deployment that addresses the specific fire suppression needs of different areas within the facility.

A main supply track 40 may extend along the length of the rail system to provide continuous electrical power to the robot 1 as the robot 1 moves along the predetermined path. In some embodiments, the main supply track 40 may be made of aluminum and may comprise inverted internal tracks that represent electrodes connected to supply tracks moving with the robot 1. The main supply track 40 may enable the robot 1 to maintain power during transit, stationary monitoring, and active fire suppression operations. The arrangement of components may allow the robot 1 to traverse the entire length of the monitored area while maintaining access to multiple extinguishing material supply points through the electric valves 15 and continuous electrical power through the main supply track 40.

Figure 2:
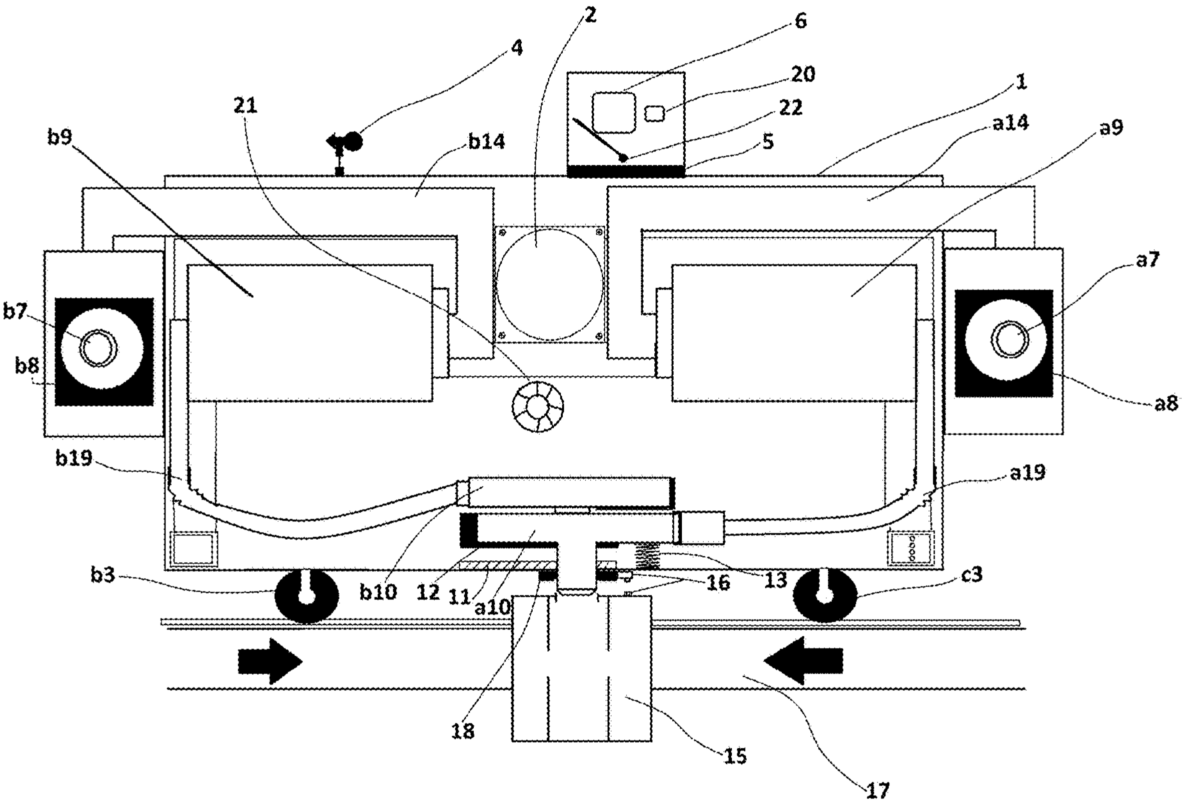
FIG. 2 illustrates a front cutaway view of the robot of FIG. 1 with internal components, according to aspects of the present disclosure.

Referring to FIG. 2, the robot 1 may comprise a housing with removable faces that provide access to internal components for maintenance and servicing operations. The housing may be detachable and re-installable to facilitate transportation, maintenance, and system reconfiguration as needed. In some embodiments, the housing may comprise a cube-shaped box. In other embodiments, the housing may have a rectangular, cylindrical, or other suitable configuration. The housing may be constructed from various materials including metal, plastic, or reinforced carbon fiber, depending on the environmental conditions and durability requirements of the specific installation. The removable faces of the housing may allow for field servicing and component replacement without requiring complete system disassembly.

As shown in FIG. 2, a rack structure 23 may be positioned within the housing and may serve as the internal supporting framework for the robot 1. The rack structure 23 may be configured in an L-shaped profile that provides structural support for the internal components while maintaining the compact form factor of the robot 1. The rack structure 23 may extend from inside the housing to behind and outside the housing, creating additional mounting surfaces and structural connections that enhance the stability of the robot 1 during operation. In some embodiments, the rack structure 23 may serve as a supporting structure from the inside and may extend behind the housing to the outside. The rack structure 23 may partially encircle the pipe rack 24 to provide additional lateral stability and may prevent the robot 1 from disengaging from the rail system during movement or fire suppression operations. The L-shaped configuration of the rack structure 23 may enable the rack structure 23 to partially encircle the pipe rack 24, creating a curvature around the pipe rack 24 that provides enhanced stability to the robot 1. This curvature may be particularly advantageous in cases of strong winds, as the wrapped configuration may increase resistance to lateral forces and may prevent the robot 1 from being displaced or destabilized during high-wind conditions in outdoor installations.

The rack structure 23 may be hollowed internally to facilitate the routing of electrical wires throughout the robot 1. The internal hollow configuration of the rack structure 23 may provide protected pathways for electrical connections between various components of the robot 1, including power distribution wires, control signals, and sensor communications. In some embodiments, the rack structure 23 may be emptied from the inside to facilitate the movement of electrical wires 31 and electrical wires 32 inside. The hollow design may also reduce the overall weight of the rack structure 23 while maintaining structural integrity and providing organized cable management within the confined space of the housing.

The L-shaped profile of the rack structure 23 may provide mounting points for various internal components while distributing mechanical loads throughout the robot 1 structure. The extended portion of the rack structure 23 that projects outside the housing may interface with the pipe rack 24 and may provide additional stability during movement along the upper rail track a25 and lower rail track b25.

With continued reference to FIG. 2, an electric motor 2 may be positioned inside the robot 1 housing and may provide the primary motive force for the robot 1 movement along the rail system. The electric motor 2 may be connected from the rear to a driving wheel a3 to control the robot 1 forward and backward movement along the predetermined path. The electric motor 2 may receive electrical power from the main supply track 40 and may be controlled by control signals that determine the direction and speed of robot 1 movement based on fire detection inputs and programmed operational parameters.

Figure 3:
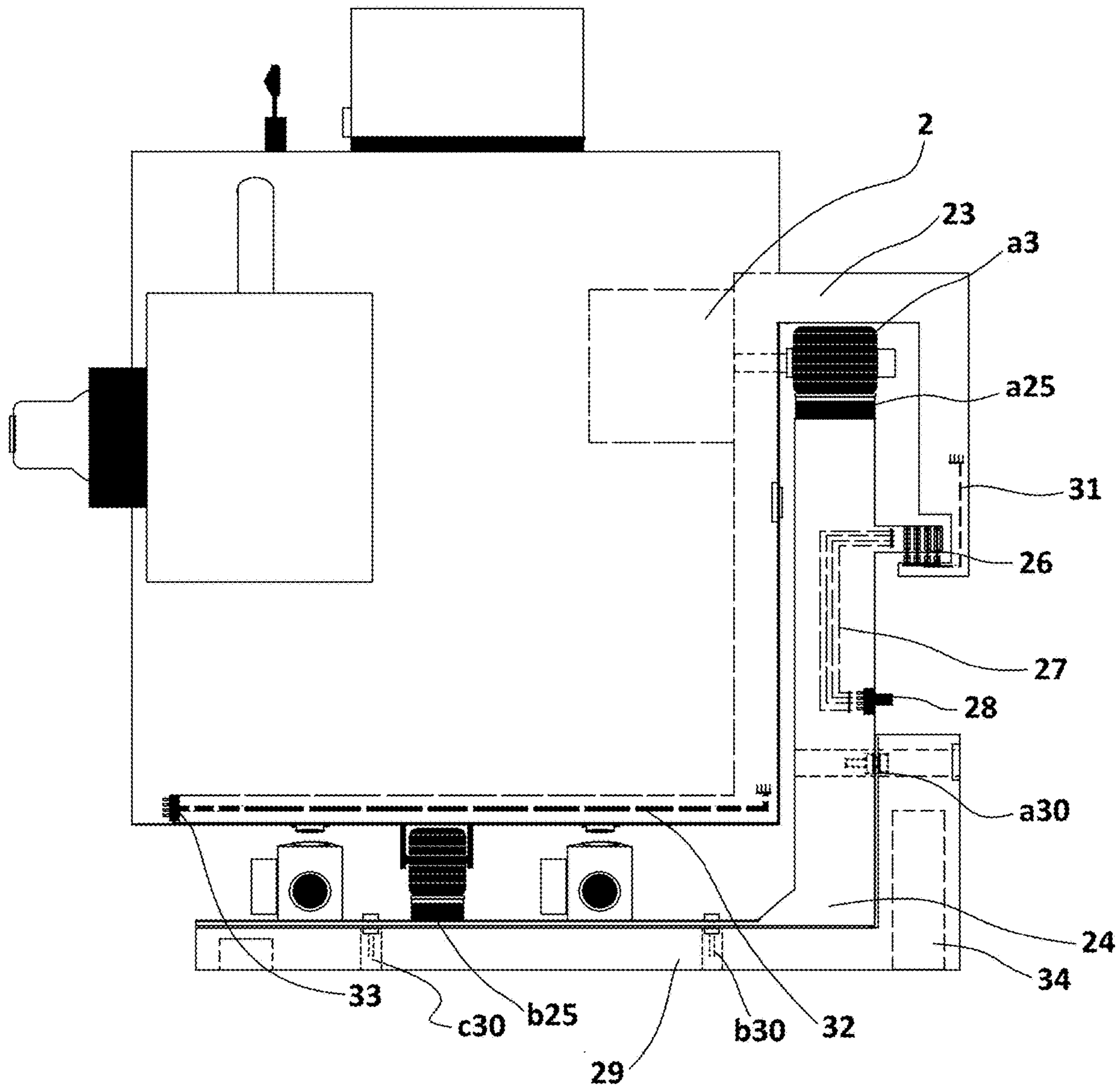
FIG. 3 illustrates a side view of the fire extinguishing robot installation system with structural mounting configuration, according to aspects of the present disclosure.

As shown in FIG. 2 and FIG. 3, the driving wheel a3 may be mechanically coupled to the electric motor 2 and may serve as the primary drive mechanism for robot 1 locomotion. The driving wheel a3 may engage with the upper rail track a25 to provide controlled movement along the rail system. The connection between the electric motor 2 and the driving wheel a3 may enable precise positioning of the robot 1 at designated coordinates along the upper rail track a25, allowing the robot 1 to stop at specific locations corresponding to electric valve 15 positions.

The robot 1 may also include two additional driven wheels positioned at the bottom of the robot 1 housing. The driven wheel b3 and driven wheel c3 may be configured to move freely according to the movement of the driving wheel a3. In some embodiments, the electric motor 2 may be connected from the bottom to the two driven wheels b3 and c3, which may be free to move forward and backward to travel according to the movement of the driving wheel a3. The driven wheel b3 and driven wheel c3 may engage with the lower rail track b25 to provide stable support and guidance for the robot 1 during movement along the predetermined path. The driven wheels may rotate passively in response to the motion generated by the driving wheel a3 and may maintain contact with the lower rail track b25 to prevent lateral movement or derailment of the robot 1.

Referring to FIG. 3, the arrangement of the driving wheel a3 on the upper rail track a25 and the driven wheel b3 and driven wheel c3 on the lower rail track b25 may create a stable three-point contact system that maintains robot 1 alignment during operation. The upper rail track a25 may bear the driving forces transmitted through the driving wheel a3, while the lower rail track b25 may provide support and stability through contact with the driven wheel b3 and driven wheel c3. The rack structure 23 may partially encircle the pipe rack 24 to provide additional lateral stability and may prevent the robot 1 from disengaging from the rail system during movement or fire suppression operations. The L-shaped configuration of the rack structure 23 may enable the rack structure 23 to partially encircle the pipe rack 24, creating a curvature around the pipe rack 24 that provides enhanced stability to the robot 1. This curvature may be particularly advantageous in cases of strong winds, as the wrapped configuration may increase resistance to lateral forces and may prevent the robot 1 from being displaced or destabilized during high-wind conditions in outdoor installations.

The dual-rail configuration with the driving wheel a3 engaging the upper rail track a25 and the driven wheels engaging the lower rail track b25 may enable the robot 1 to traverse the entire length of the monitored area while maintaining proper alignment and contact with both rail tracks. The electric motor 2 may provide sufficient torque to move the robot 1 along the rail system while carrying the internal components including pumps, extinguishing materials, and control systems that may be housed within the housing structure.

With continued reference to FIG. 2, a controller 5 may be positioned at the top of the robot 1 and may serve as the central processing unit for coordinating fire detection, analysis, and suppression operations. The controller 5 may receive input signals from various sensors throughout the system and may execute programmed algorithms to determine appropriate responses to detected fire conditions. The controller 5 may be configured to process data from multiple sources simultaneously and may make autonomous decisions regarding robot 1 movement, material selection, and fire suppression actions based on artificial intelligence and machine learning algorithms.

The compatibility between the robot's components may be achieved through organized algorithms that enable harmonious coordination of fire detection, analysis, and suppression functions. When a fire hazard is sensed at a location, the fire sensors 37 may send a call signal to the robot 1 to direct the robot to the hazard location. Upon arrival, the thermal imaging camera 20 and the controller 5 may analyze fire data including smoke patterns, flame characteristics, and environmental conditions to determine fire type and optimal suppression strategy. The controller 5 may then direct the spray nozzle a7 and spray nozzle b7 to the required orientations using the steering motor a8 and steering motor b8 based on the thermal analysis results. This organized algorithmic coordination between fire sensors, navigation systems, thermal analysis, and spray nozzle control may enable the robot 1 to respond to fire hazards with precision and efficiency through harmonious operation of integrated components.

A thermal imaging camera 20 may be mounted adjacent to the controller 5 and may utilize artificial intelligence techniques to analyze smoke patterns, flame characteristics, and environmental changes within the monitored area. In some embodiments, the controller 5 may comprise the thermal imaging camera 20. The thermal imaging camera 20 may continuously monitor temperatures throughout the facility and may compare current readings with baseline environmental data stored in the controller 5 database. The thermal imaging camera 20 may be configured to identify temperature variations that deviate from normal operational parameters and may classify different types of fires based on thermal signatures, smoke patterns, and flame behavior. In some embodiments, the thermal imaging camera 20 may analyze the pattern and form of smoke, fire, and changes in the surrounding environment to determine the location of the fire, the type of damaged equipment, and the most appropriate material to extinguish it.

The thermal imaging camera 20 may employ computer vision algorithms to determine the precise shape and size of fire hotspots, enabling targeted fire suppression that focuses on the primary source of flames rather than surrounding areas. The computer vision algorithms may analyze thermal images in real-time and may direct spray nozzle positioning to concentrate extinguishing materials on the most active fire zones. The thermal imaging camera 20 may also predict the likelihood of fire occurrence before ignition by detecting abnormally high temperatures and unusual thermal patterns that may indicate developing fire conditions.

As shown in FIG. 2, a flashlight 6 may be positioned next to the thermal imaging camera 20 and may provide illumination during night operations or in low-light conditions. The flashlight 6 may enable visual monitoring and remote control operations when natural lighting may be insufficient for effective fire suppression activities. In some embodiments, the robot 1 may optionally further comprise a rain scanner 22 that may be mounted near the thermal imaging camera 20 and the flashlight 6 and may operate to clean the camera and flashlight glass surfaces when environmental conditions such as rain, dust, or smoke may impair visibility or sensor performance.

The wind direction sensor 4 may be mounted at the top exterior of the robot 1 and may continuously monitor wind conditions that may affect fire suppression operations. The wind direction sensor 4 may provide data to the controller 5 regarding wind speed and direction, enabling the controller 5 to calculate optimal positioning for the robot 1 relative to fire locations. The controller 5 may use wind direction data to determine stopping positions that place the robot 1 upwind from fire locations, allowing extinguishing materials to be carried toward the fire rather than away from the target area. In some embodiments, the robot 1 may head to the nearest electric valve 15 located near the fire after considering the wind sensor signal from the wind direction sensor 4.

The rear electrical coil 21 may be positioned at the rear portion of the robot 1 and may control precise stopping of the robot 1 at designated coordinates along the rail system. The rear electrical coil 21 may interact with stop sensors positioned along the track to achieve accurate positioning at electric valve 15 locations. When the robot 1 approaches a target stopping position, the controller 5 may activate the rear electrical coil 21 to attract metallic components within stop sensors, causing the electric motor 2 to halt and positioning the robot 1 at the correct coordinates for connection to the electric valve 15. In some embodiments, the rear electrical coil 21 operation may be controlled by the controller 5, and once the desired electric valve position is approached, the robot 1 may travel slowly until the rear electrical coil 21 is faced with the free iron piece 35 to stop.

The controller 5 may incorporate machine learning capabilities that enable continuous performance improvement through data collection from each fire incident. The machine learning algorithms may analyze the effectiveness of different extinguishing materials against specific fire types and may record fire spread patterns at particular locations to improve decision accuracy in future incidents. The controller 5 may learn normal temperature readings for the monitored site and may identify illogical temperature variations that may indicate developing fire conditions or equipment malfunctions. In some embodiments, the robot 1 may be pre-programmed in case of non-response to start selecting the appropriate material and start extinguishing the fire.

The controller 5 may be configured to automatically disconnect electrical supply from equipment when detecting temperature differences that exceed predetermined thresholds or when identifying fire hazards through the thermal imaging camera 20 analysis. The automatic power disconnection capability may prevent electrical fires from developing and may reduce the severity of existing fires by eliminating electrical energy sources that may contribute to fire propagation. The controller 5 may send commands to electrical breakers to cut power to specific equipment zones while maintaining power to fire suppression systems and emergency lighting. In some embodiments, the robot 1 may contact an emergency center to report the fire and open a live broadcast through the thermal imaging camera 20 to allow specialists to control the robot 1 remotely to extinguish the fire.

The controller 5 may be configured to coordinate multiple operational functions in an integrated manner to achieve autonomous fire suppression capabilities. In some embodiments, the controller 5 may control the electric motor 2 to move the robot 1 to fire locations based on fire detection signals and predetermined coordinate data. The controller 5 may direct the at least one spray nozzle using the at least one steering motor to target fire hotspots identified through thermal imaging analysis. The controller 5 may activate the electromagnetic coil 11 to connect the at least one lower extinguishing hose with the electric valve 15, enabling extinguishing material to be pumped through the at least one fire pump to the spray nozzles. These integrated control functions may operate autonomously based on artificial intelligence algorithms, or may be supplemented with remote operator control through wireless communication interfaces. The coordinated operation of these controller functions may enable rapid response to fire incidents while maintaining precise targeting of extinguishing materials to minimize collateral damage.

With continued reference to FIG. 2, a fire pump a9 and a fire pump b9 may be positioned inside the robot 1 housing to provide pressurized delivery of extinguishing materials to the spray nozzles during fire suppression operations. In some embodiments, the robot 1 may comprise two fire pumps a9 and b9 inside the housing, the number of which may be increased when needed. The fire pump a9 and the fire pump b9 may vary in terms of manufacturing components, which may determine the type of extinguishing material used by each pump. The manufacturing components of each pump may be selected based on the chemical compatibility requirements of different extinguishing materials, such as water, foam, gases, or dry powders.

The fire pump a9 may be constructed with materials and sealing components that may be compatible with a first type of extinguishing material, while the fire pump b9 may incorporate different manufacturing components that may be suitable for a second type of extinguishing material. The variation in manufacturing components may include different pump housing materials, impeller compositions, sealing materials, and internal coatings that may resist corrosion or chemical degradation when exposed to specific extinguishing agents. The pump components may be selected to maintain operational integrity and performance when handling different extinguishing materials that may have varying viscosities, chemical properties, or corrosive characteristics.

As shown in FIG. 2, a spray nozzle a7 and a spray nozzle b7 may be positioned on the right and left sides of the robot 1 respectively to direct extinguishing materials toward fire locations from multiple angles. In some embodiments, the robot 1 may comprise spray nozzles a7 and b7 on both sides of the right and left housing that may be increased when needed. The spray nozzle a7 and the spray nozzle b7 may be configured to discharge different types of extinguishing materials based on the fire classification and suppression requirements determined by the controller 5 analysis. The number of spray nozzles may be increased when needed beyond the basic configuration of the spray nozzle a7 and the spray nozzle b7 to provide enhanced coverage or specialized material delivery capabilities for larger or more complex fire suppression scenarios.

A steering motor a8 may be mounted at the bottom of the spray nozzle a7 and may be wired to the controller 5 to enable automatic or remote directional control of the spray nozzle a7. Similarly, a steering motor b8 may be positioned at the bottom of the spray nozzle b7 and may be connected to the controller 5 to provide directional control of the spray nozzle b7. In some embodiments, the spray nozzles may have steering motors a8 and b8 at the bottom wired to the controller 5, and these motors may be steered automatically or remotely by the controller 5. The steering motor a8 and the steering motor b8 may receive control signals from the controller 5 that may direct the spray nozzles to focus extinguishing materials on specific fire hotspots identified by the thermal imaging camera 20 analysis.

The steering motor a8 and the steering motor b8 may enable precise angular positioning of the spray nozzle a7 and the spray nozzle b7 respectively, allowing targeted application of extinguishing materials to the primary source of flames rather than broad area coverage. The directional control capability may reduce material consumption and may minimize collateral damage to equipment or goods in the vicinity of the fire. The controller 5 may automatically adjust the spray nozzle positioning based on real-time thermal imaging data, or remote operators may manually control the steering motor a8 and the steering motor b8 through wireless communication links. In some embodiments, the steering of the steering motors a8 and b8 may be controlled either through orientation based on AI technologies or self-orientation by contacting the control center after reporting the fire and live broadcasting the event through the camera.

With continued reference to FIG. 2, a flexible pipe a14 may connect the fire pump a9 to the spray nozzle a7, providing a fluid pathway for extinguishing materials from the pump to the discharge nozzle. The flexible pipe a14 may be constructed from materials that may be compatible with the extinguishing material handled by the fire pump a9 and may maintain flexibility to accommodate movement of the spray nozzle a7 during directional adjustments controlled by the steering motor a8.

A flexible pipe b14 may connect the fire pump b9 to the spray nozzle b7, establishing a fluid connection that may enable the fire pump b9 to deliver extinguishing materials to the spray nozzle b7. The flexible pipe b14 may be manufactured from materials that may be suitable for the specific extinguishing material pumped by the fire pump b9 and may provide sufficient flexibility to allow directional movement of the spray nozzle b7 under control of the steering motor b8.

A flexible pipe a19 may connect the fire pump a9 to lower hose components, providing a fluid pathway from the extinguishing materials supply pipe 17 to the fire pump a9 input. The flexible pipe a19 may enable the fire pump a9 to draw extinguishing materials from the supply system and may accommodate the vertical movement of lower hose assemblies during connection and disconnection operations with the electric valve 15. In some embodiments, the robot 1 may comprise pipes a19 and b19 made of metal or plastics and their derivatives that may be connected from the bottom to the pumps.

A flexible pipe b19 may connect the fire pump b9 to lower hose components, establishing a fluid connection between the extinguishing materials supply pipe 17 and the fire pump b9. The flexible pipe b19 may allow the fire pump b9 to receive extinguishing materials from the supply system and may provide flexibility to accommodate the mechanical movement of lower hose assemblies during valve connection procedures.

With continued reference to FIG. 2, a first lower extinguishing hose a10 and a second lower extinguishing hose b10 may be positioned within the robot 1 housing and may be configured in a T-shaped profile to facilitate connection with the extinguishing materials supply pipe 17. In some embodiments, the robot 1 may comprise lower extinguishing hoses in the shape of the Latin letter T, specifically hoses a10 and b10, which may be made of metal or plastics and their derivatives and may be manufactured to suit the properties of the fire suppression material used. The first lower extinguishing hose a10 may be connected to the fire pump a9, while the second lower extinguishing hose b10 may be connected to the fire pump b9. The T-shaped configuration of the first lower extinguishing hose a10 and the second lower extinguishing hose b10 may provide a connection interface that enables fluid communication between the extinguishing materials supply pipe 17 and the respective fire pumps during fire suppression operations.

The first lower extinguishing hose a10 and the second lower extinguishing hose b10 may be constructed from metal or plastics and their derivatives, with the specific material selection being determined by the properties of the fire suppression material that may be handled by each hose. The manufacturing materials of the first lower extinguishing hose a10 and the second lower extinguishing hose b10 may be selected to provide chemical compatibility with different extinguishing agents, including water, foam, gases, or dry powders. The material composition may resist corrosion, chemical degradation, or thermal damage that may occur when exposed to various extinguishing materials under operational conditions.

As shown in FIG. 2, a metal chip 12 (preferably an iron chip 12) may be installed at the bottom interior portion of each of the first lower extinguishing hose a10 and the second lower extinguishing hose b10. In some embodiments, there may be an iron chip 12 installed at the bottom from the inside of each lower extinguishing hose. The iron chip 12 may serve as a magnetic interface component that responds to electromagnetic forces generated by control systems within the robot 1. The iron chip 12 may be positioned to enable controlled vertical movement of the first lower extinguishing hose a10 and the second lower extinguishing hose b10 during connection and disconnection operations with the electric valve 15.

A return spring 13 may be associated with the first lower extinguishing hose a10 and the second lower extinguishing hose b10 to maintain the hoses in an ascending natural position when not actively connected to the electric valve 15. In some embodiments, the natural position of the hoses may be ascending depending on the return spring 13. The return spring 13 may provide upward force that counteracts the weight of the hose assemblies and may ensure that the first lower extinguishing hose a10 and the second lower extinguishing hose b10 remain in a retracted position during robot 1 movement along the rail system. The return spring 13 may enable automatic retraction of the hoses when electromagnetic forces are removed, allowing the robot 1 to disengage from the electric valve 15 and continue movement along the predetermined path.

An electromagnetic coil 11 may be installed on the lower wall of the robot 1 housing and may be wired to the controller 5 to provide controlled actuation of the hose connection system. The electromagnetic coil 11 may receive electrical power from one or more feed outlets 33 positioned within the robot 1 housing. The feed outlets 33 may serve as electrical distribution points that deliver power from the main electrical supply system to various operational components of the robot 1. The electromagnetic coil 11 may be connected to a dedicated feed outlet 33 through electrical wiring that may include appropriate circuit protection devices such as fuses or circuit breakers to prevent overcurrent conditions. The controller 5 may regulate the electrical current supplied to the electromagnetic coil 11 through control signals that activate or deactivate power delivery from the feed outlet 33, enabling precise timing of the electromagnetic attraction forces that control hose movement. In some embodiments, the electromagnetic coil 11 may be positioned opposite to the iron chip 12 at the bottom of the housing and may be installed on the wall of the lower housing portion. The electromagnetic coil 11 may generate magnetic forces that attract the iron chip 12 positioned within the first lower extinguishing hose a10 and the second lower extinguishing hose b10. When the controller 5 activates the electromagnetic coil 11, the magnetic attraction may overcome the upward force of the return spring 13 and may cause the selected hose to move downward for connection with the electric valve 15.

The electromagnetic coil 11 may enable selective activation of either the first lower extinguishing hose a10 or the second lower extinguishing hose b10 based on the type of extinguishing material determined to be appropriate for the detected fire conditions. The controller 5 may send control signals to the electromagnetic coil 11 to attract the iron chip 12 associated with the hose connected to the appropriate extinguishing material supply line. In some embodiments, after determining the type of fire and the material required for extinguishing, the controller 5 may send a wired signal to the electromagnetic coil 11 associated with the track of the specified fire extinguishing material to attract the iron chip 12 with the lower fire hose. The selective activation capability may allow the robot 1 to choose between different extinguishing materials without requiring mechanical switching mechanisms or manual intervention.

With continued reference to FIG. 2, the outlets of the first lower extinguishing hose a10 and the second lower extinguishing hose b10 may be configured to interface with the electric valve 15 when the electromagnetic coil 11 moves the hoses to the downward position. In some embodiments, the outlets of the lower hoses may be configured when operating to coalesce to the electric valves 15 to operate as a single piece by depending on the attraction forces. The connection interface may enable the hose outlets to coalesce with the electric valve 15 to form a unified fluid pathway that allows extinguishing materials to flow from the extinguishing materials supply pipe 17 through the electric valve 15 to the selected fire pump.

An electrical communication port 16 may be positioned at the connection interface between the hose outlets and the electric valve 15. In some embodiments, the electrical communication port 16 may be connected to the hose outlets from the exterior and may operate upon coalescence to supply the electric valves 15 with electrical current. The electrical communication port 16 may establish electrical contact with the electric valve 15 when the first lower extinguishing hose a10 or the second lower extinguishing hose b10 connects to the valve. The electrical communication port 16 may supply electrical current to the electric valve 15 upon coalescence, enabling the valve to open and allow extinguishing material flow from the extinguishing materials supply pipe 17 to the connected hose and fire pump.

A sealant 18 may be incorporated into the connection interface between the hose outlets and the electric valve 15 to ensure complete sealing during fluid transfer operations. In some embodiments, the sealant 18 may secure the connection and ensure sealing completely. The sealant 18 may prevent leakage of extinguishing materials at the connection point and may maintain system pressure during pumping operations. The sealant 18 may be configured to provide reliable sealing when the electromagnetic coil 11 attracts the iron chip 12 and presses the hose outlet against the electric valve 15, creating a secure fluid connection that enables effective material transfer.

The extinguishing materials supply pipe 17 may be constructed from metal or plastics and their derivatives, with material selection being based on compatibility with the specific extinguishing agents that may be transported through each pipe section. In some embodiments, the extinguishing materials supply pipe 17 may contain pipes made of plastic or metal located on the pipe rack 24, with the beginning of these pipes connected to tanks of extinguishing materials and the end closed and comprising electric valves 15. The extinguishing materials supply pipe 17 may deliver various fire suppression materials to the electric valve 15 locations along the rail system, enabling the robot 1 to access different extinguishing agents at multiple points throughout the monitored area.

The electric valve 15 may be manufactured with specifications that correspond to the sizes of the first lower extinguishing hose a10 and the second lower extinguishing hose b10 to ensure proper mechanical and fluid interface compatibility. The valve specifications may include inlet and outlet dimensions that match the hose connection requirements, as well as flow capacity ratings that accommodate the pumping capabilities of the fire pump a9 and the fire pump b9. The electric valve 15 may operate as a solenoid valve that opens when electrical power is supplied through the electrical communication port 16 and may close when electrical power is removed. In some embodiments, the electric valves 15 may operate with screw actuators similar to valves known as solenoid valves and may be manufactured with specifications corresponding to the sizes of the lower hoses. The system architecture may ensure that each fire pump is connected to a dedicated lower extinguishing hose, and each lower extinguishing hose may be met by a corresponding supply track with independent electric valves. This configuration may enable the robot 1 to access multiple types of extinguishing materials through separate supply routes, with each pump-hose-valve combination being independently operable to deliver a specific extinguishing material appropriate for different fire classifications.

Each section of the extinguishing materials supply pipe 17 may be manufactured in proportion to the characteristics of the specific fire suppression material that may be transported through that particular pipe track. In some embodiments, each pipe track may be manufactured in proportion to the characteristics of the fire suppression material used, allowing for the provision of supply lines for various extinguishing materials including water, foam, gases, and powders to the same operational path. The pipe manufacturing specifications may include internal diameter, wall thickness, material composition, and surface treatments that may be appropriate for the chemical and physical properties of different extinguishing agents. The proportional manufacturing approach may ensure that each pipe track provides optimal flow characteristics and material compatibility for the specific extinguishing material being supplied to the associated electric valve 15 locations.

Referring to FIG. 1 and FIG. 3, the pipe rack 24 may be configured in an profile that provides structural support for both the rail track system and the extinguishing materials supply infrastructure. The configuration of the pipe rack 24 may create a stable mounting platform that extends along the installation path while accommodating the dual-rail arrangement and the extinguishing materials supply pipe 17. The profile may provide sufficient structural rigidity to support the weight of the robot 1 during movement and fire suppression operations while maintaining proper alignment of the upper rail track a25 and the lower rail track b25.

As shown in FIG. 1 and FIG. 3, the pipe rack 24 may support the upper rail track a25 on the upper portion of the L-shaped structure, providing a guided path for the driving wheel a3 of the robot 1. The lower rail track b25 may be positioned on the lower portion of the pipe rack 24, creating a stable support surface for the driven wheel b3 and the driven wheel c3. In some embodiments, the upper rail track a25 may be disposed on the pipe rack 24, which may be chosen to hang the rack on wall brackets 29 fixed on the wall or disposed on column racks through the installation guide 34. The L-shaped configuration may maintain proper spacing between the upper rail track a25 and the lower rail track b25, ensuring consistent contact between the robot 1 wheels and the rail surfaces throughout the length of the installation.

The extinguishing materials supply pipe 17 may be mounted on the pipe rack 24 alongside the rail tracks, creating an integrated infrastructure that provides both mobility and material supply capabilities for the robot 1. The pipe rack 24 may include mounting provisions for multiple extinguishing materials supply pipes when different fire suppression materials may be required at various locations throughout the monitored area. The L-shaped profile of the pipe rack 24 may accommodate the routing of the extinguishing materials supply pipe 17 while maintaining clearance for the robot 1 movement and connection operations with the electric valve 15. In some embodiments, the pipe rack 24 may comprise positions for fire sensors 37, which may be flame probes, miniature thermal cameras, smoke sensors, or temperature sensors, and their number may be determined or increased according to the area of the location.

With continued reference to FIG. 1 and FIG. 3, the wall brackets 29 may secure the pipe rack 24 to existing facility wall structures, providing a primary mounting method for installations where wall attachment may be feasible and appropriate. The wall brackets 29 may be configured in an L-shaped profile that corresponds to the pipe rack 24 configuration, creating a secure mechanical interface between the pipe rack 24 and the facility walls. The wall brackets 29 may distribute the structural loads from the pipe rack 24, robot 1, and extinguishing materials supply pipe 17 across the wall surface, ensuring stable support during operational conditions.

The wall brackets 29 may enable the pipe rack 24 to be hung on facility walls at predetermined heights that may be appropriate for the specific installation requirements and equipment layout within the monitored area. The wall mounting configuration may provide a space-efficient installation method that utilizes existing wall structures without requiring additional floor-mounted supports or column installations. The wall brackets 29 may be positioned at regular intervals along the length of the pipe rack 24 to provide adequate support distribution and may accommodate thermal expansion and contraction of the pipe rack 24 during temperature variations.

As shown in FIG. 3, an installation guide 34 may facilitate the positioning and alignment of the pipe rack 24 during installation procedures. The installation guide 34 may provide reference points and alignment features that ensure proper positioning of the pipe rack 24 relative to facility structures and equipment. The installation guide 34 may include measurement markings, alignment indicators, or positioning templates that enable accurate placement of the pipe rack 24 at the correct height and orientation for optimal robot 1 operation and fire suppression coverage. In some embodiments, the installation guide 34 may enable levels to be controlled upwards and downwards according to the position of devices or equipment at the locations.

With continued reference to FIG. 3, bolts a30, bolts b30, and bolts c30 may ensure the attachment of the pipe rack 24 to the wall brackets 29 to guarantee stability of the installation system. The bolts a30, bolts b30, and bolts c30 may be configured to secure the pipe rack 24 to the wall brackets 29, creating a rigid mechanical connection that prevents movement or displacement during robot 1 operations. The bolts a30, bolts b30, and bolts c30 may provide multiple fastening points along the length of the pipe rack 24, distributing structural loads and ensuring stable support during robot 1 operations.

The installation guide 34 may enable vertical adjustment of the pipe rack 24 levels, allowing the rack height to be controlled upward and downward according to the position of devices or equipment at the monitored locations. The vertical adjustment capability may accommodate varying equipment heights, ceiling clearances, and operational requirements within different areas of the facility. The installation guide 34 may include adjustment mechanisms that enable precise height control while maintaining proper alignment of the upper rail track a25 and the lower rail track b25.

The adjustable rack height feature provided by the installation guide 34 may enable customization of the robot 1 operating height to optimize fire detection and suppression effectiveness for specific equipment configurations and facility layouts. The vertical adjustment capability may allow the thermal imaging camera 20 and the spray nozzle a7 and spray nozzle b7 to be positioned at optimal heights relative to potential fire sources and equipment that may require protection. The installation guide 34 may maintain structural stability and alignment accuracy throughout the range of vertical adjustment positions.

The secure attachment provided by the bolts a30, bolts b30, and bolts c30 between the pipe rack 24 and the wall brackets 29 may enable reliable installation that accommodates different facility layouts and structural requirements. The wall mounting configuration using the wall brackets 29 secured by the bolts a30, bolts b30, and bolts c30 may provide stable support for the entire rail-mounted fire suppression system while maintaining proper alignment and structural integrity during all operational conditions.

Figure 4:
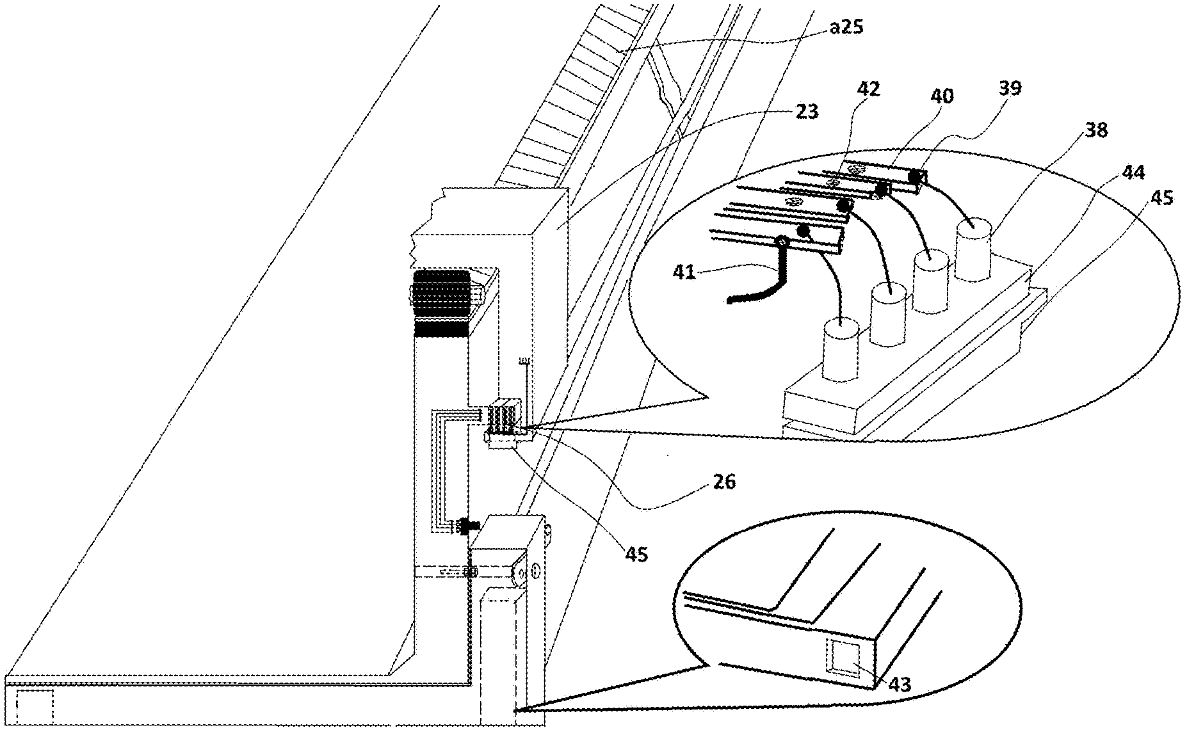
FIG. 4 illustrates a detailed view of an electrical power supply system for the rail-mounted fire extinguishing robot, according to aspects of the present disclosure.

Referring to FIG. 3 and FIG. 4, a main supply track 40 may extend along the length of the rail system to provide continuous electrical power distribution throughout the monitored area. The main supply track 40 may be mounted on the rack structure 23 and may comprise inverted internal tracks that serve as electrical conductors for power transmission to the robot 1 during movement and stationary operations. In some embodiments, the main supply track 40 may be made of aluminum and may extend along the length and extension of the track of the rail and may comprise inverted internal tracks that represent electrodes connected to supply tracks moving with the robot 1. The main supply track 40 may be constructed from aluminum and may extend along the length and extension of the upper rail track a25 and lower rail track b25 to ensure continuous power availability throughout the operational range of the robot 1.

The flexible moving contact heads 39 may move within incubator grooves formed along the main supply track 40. The incubator grooves may provide guided channels that maintain proper alignment of the flexible moving contact heads 39 with the electrodes 41 during robot movement. The incubator grooves may protect the electrical contact surfaces from environmental contamination while enabling smooth sliding movement of the flexible moving contact heads 39 along the length of the main supply track 40.

As shown in FIG. 3, a main branch 26 may serve as the primary electrical distribution point that receives electrical power and distributes the power through the electrical supply system to various components of the robot 1. The main branch 26 may be positioned along the rail system and may provide a centralized connection point for electrical power distribution to multiple sections of the main supply track 40. The main branch 26 may accommodate different electrical phases and voltage requirements that may be needed for various operational components of the robot 1. In some embodiments, the robot 1 may be supplied with electricity through an electricity supply point 28 which may pass electricity through a set of wires 27 until it reaches the main branch 26 and to the supply point of the robot 1 components.

Wires 27 may extend from the main branch 26 to distribute electrical power throughout the supply system. The wires 27 may carry electrical current from the main branch 26 to various connection points along the main supply track 40, enabling power distribution across the entire length of the rail system. The wires 27 may be sized and configured to handle the electrical load requirements of the robot 1, including high-power components such as the fire pump a9 and the fire pump b9 during active fire suppression operations. In some embodiments, the terminal ends of the wires 27 may be connected to the main supply track 40 through electrodes 41 fixed to it by fixing screws 42 so that each electric phase has a specific pole.

An electricity supply point 28 may be positioned along the electrical distribution system to provide a connection interface for external power sources. The electricity supply point 28 may receive electrical power from facility electrical systems and may supply the power to the main branch 26 for distribution throughout the robot 1 supply system. The electricity supply point 28 may include appropriate electrical protection devices and connection hardware to ensure safe and reliable power transfer from facility electrical systems to the robot 1 electrical infrastructure.

With continued reference to FIG. 3, electrical wires 31 and electrical wires 32 may be routed through the rack structure 23 to provide organized and protected electrical connections within the robot 1 housing. The electrical wires 31 and the electrical wires 32 may carry power and control signals between various components of the robot 1, including the controller 5, the electric motor 2, the fire pump a9, the fire pump b9, and sensor systems. The hollow internal configuration of the rack structure 23 may provide protected pathways for the electrical wires 31 and the electrical wires 32, preventing damage from environmental conditions and mechanical interference during robot 1 operations.

One or more feed outlets 33 may be positioned within the robot 1 housing to deliver electrical power to the robot 1 internal components during operation. The feed outlets 33 may comprise electrical distribution terminals, junction boxes, or power distribution modules that receive electrical power from the main supply track 40 through the flexible moving contact heads 39 and distribute the power to various operational components throughout the robot 1. The feed outlets 33 may provide multiple voltage levels or electrical phases as required by different components, enabling a single main power supply connection to serve diverse electrical loads with varying power requirements. In some embodiments, separate feed outlets 33 may be provided for different functional systems within the robot 1. A first feed outlet may supply power to the electric motor 2 and drive system components. A second feed outlet may supply power to the controller 5 and sensor systems including the thermal imaging camera 20 and wind direction sensor 4. A third feed outlet may supply power to the electromagnetic coil 11 that controls lower extinguishing hose movement. A fourth feed outlet may supply power to the fire pump a9 and fire pump b9 during active fire suppression operations. The segregated feed outlet configuration may enable independent circuit protection for different systems, preventing a fault in one system from affecting the operation of other critical components. The feed outlets 33 may incorporate electrical connection interfaces that enable components to be connected and disconnected for maintenance or replacement without requiring modification to the main electrical distribution system. The feed outlets 33 may include appropriate electrical ratings to handle the current demands of connected components, with higher-capacity feed outlets provided for high-power loads such as the fire pumps and electric motor, and lower-capacity feed outlets provided for control and sensor systems. The feed outlets 33 may be positioned at convenient locations within the robot 1 housing to minimize wire routing distances and simplify the internal electrical architecture.

Referring to FIG. 4, electrodes 41 may be secured to the main supply track 40 to provide electrical connection points for power distribution along the rail system. The electrodes 41 may be positioned at regular intervals along the main supply track 40 and may serve as contact points for electrical power transfer to the robot 1 during movement along the rail system. Each of the electrodes 41 may be associated with a specific electrical phase, enabling multi-phase power distribution that may accommodate different voltage and current requirements of robot 1 components.

Fixing screws 42 may secure the electrodes 41 to the main supply track 40, providing mechanical attachment that maintains proper electrical contact and positioning during operational conditions. The fixing screws 42 may ensure that the electrodes 41 remain properly aligned and securely attached to the main supply track 40 despite vibrations, thermal expansion, and mechanical forces that may occur during robot 1 movement and fire suppression operations. The fixing screws 42 may be constructed from materials that provide electrical conductivity and corrosion resistance appropriate for the operational environment.

As shown in FIG. 4, flexible moving contact heads 39 may be positioned on the robot 1 to maintain electrical contact with the main supply track 40 while the robot 1 moves along the rail system. In some embodiments, the robot 1 may comprise flexible moving contact heads 39 moving with the robot 1. The flexible moving contact heads 39 may be designed to maintain continuous electrical contact with the electrodes 41 during robot 1 movement, ensuring uninterrupted power supply during transit and operational activities. The flexible moving contact heads 39 may accommodate variations in track alignment and mechanical tolerances while maintaining reliable electrical connectivity.

The flexible moving contact heads 39 may be connected to a contacts base 44 that provides mechanical support and positioning control for the electrical contact system. The contacts base 44 may be configured to move vertically to adjust the contact pressure between the flexible moving contact heads 39 and the electrodes 41 of the main supply track 40. The contacts base 44 may provide a stable mounting platform for the flexible moving contact heads 39 while enabling controlled adjustment of contact forces during different operational conditions.

Insulators 38 may be positioned between the flexible moving contact heads 39 to provide dielectric separation between different electrical phases and prevent short circuits during power transfer operations. In some embodiments, the flexible moving contact heads 39 may be connected from the bottom to insulators 38 that achieve the required dielectric between the poles. The insulators 38 may be constructed from materials that provide appropriate electrical insulation properties while maintaining mechanical durability under operational conditions. The insulators 38 may ensure that each electrical phase remains properly isolated while enabling the flexible moving contact heads 39 to maintain contact with the corresponding electrodes 41 on the main supply track 40.

With continued reference to FIG. 4, an electromagnetic coil 45 may be positioned adjacent to the contacts base 44 to provide controlled adjustment of contact pressure during high-power operations. The electromagnetic coil 45 may be activated by the controller 5 to attract the contacts base 44 downward, pulling the flexible moving contact heads 39 with the contacts base 44 to increase contact pressure against the electrodes 41 of the main supply track 40. In some embodiments, to achieve stability in electrical conductivity when electrical pumps operate, the controller 5 may send a command to the electromagnetic coil 45 to attract the contacts base 44 downwards and the contact heads 39 will be attracted with it, sealing the contact points to prevent loosening during electrical supply of the pumps. The electromagnetic coil 45 may ensure stable electrical conductivity during high-current operations such as when the fire pump a9 and the fire pump b9 are activated for fire suppression activities.

The electromagnetic coil 45 may receive control signals from the controller 5 that determine when increased contact pressure may be needed based on the operational requirements of the robot 1. When the controller 5 anticipates high-power operations, the electromagnetic coil 45 may be activated to tighten the contact points and prevent loosening or arcing that may occur during high-current electrical transfer. The electromagnetic coil 45 may be deactivated during normal movement operations to allow the flexible moving contact heads 39 to maintain lighter contact pressure that accommodates smooth movement along the main supply track 40.

A guide opening 43 may be positioned along the main supply track 40 to facilitate alignment and assembly of electrical supply components. The guide opening 43 may provide reference points or alignment features that ensure proper positioning of the electrodes 41, fixing screws 42, and contacts base 44 during installation and operation. The guide opening 43 may be configured to accommodate multiple component sizes and may include protective features to maintain proper alignment during assembly procedures.

The electrical supply system configuration may enable the robot 1 to receive continuous power while moving, standing still, and operating high-consumption components such as the fire pump a9 and the fire pump b9. The combination of the main supply track 40, the flexible moving contact heads 39, and the electromagnetic coil 45 may provide reliable electrical connectivity that accommodates the dynamic operational requirements of the robot 1 throughout the monitored area. The electrical supply system may maintain power delivery during all operational conditions, enabling uninterrupted fire detection, analysis, and suppression capabilities.

The fire extinguishing system may operate through a coordinated sequence of detection, analysis, navigation, and suppression activities that enable autonomous fire response capabilities. When a fire hazard occurs within the monitored area, the distributed fire sensors 37 may detect the presence of flames, smoke, elevated temperatures, or other fire indicators and may transmit wireless signals to alert the robot 1 of the fire condition. In some embodiments, when a hazard occurs, the fire sensors 37 may send a call signal to the robot 1 and the robot 1 may go to the fire location based on predetermined coordinates according to a program prepared for that purpose. The fire sensors 37 may utilize low-energy Bluetooth technology or other wireless communication protocols to send location-specific alarm signals that identify the approximate coordinates of the detected fire hazard.

Upon receiving a fire detection signal, the controller 5 may immediately initiate a verification process to confirm the presence of an actual fire condition and avoid false alarm responses. The controller 5 may request additional data from fire sensors 37 located near the suspected fire location to corroborate the initial alarm signal. The thermal imaging camera 20 may be directed toward the suspected coordinates to conduct thermal analysis of the area and confirm the presence of genuine fire patterns that distinguish actual fire conditions from false alarms caused by equipment heat, lighting changes, or environmental factors. The controller 5 may draw hypotheses considering wind direction data to confirm optimal positioning of the robot 1 relative to fire locations. The hypothesis generation process may evaluate multiple potential stopping positions and may predict the effectiveness of each position based on wind speed, wind direction, fire location, and spray nozzle capabilities. The controller 5 may select the stopping position that maximizes the probability of successful fire suppression based on the evaluated hypotheses.

Upon approaching the target fire location, the robot 1 may execute a precise stopping sequence to ensure accurate positioning at the designated stopping coordinates. The stopping sequence may begin when the controller 5 determines that the robot 1 is within a predetermined distance of the target stop sensor location. The predetermined distance may be calculated based on the current speed of the robot 1, the deceleration capabilities of the electric motor 2, and the distance required to achieve a controlled stop at the exact stopping position. The controller 5 may send a command to the electric motor 2 to reduce movement speed as the robot 1 approaches the stop sensor. The speed reduction may occur gradually to prevent abrupt deceleration that could destabilize the robot 1 or cause mechanical stress on the rail system components. In some embodiments, the robot 1 may reduce speed to approximately 10-30% of normal travel speed when approaching a stop sensor location, enabling fine positioning control during the final approach.

As the robot 1 continues its approach at reduced speed, the controller 5 may monitor the distance to the stop sensor using position sensors, encoder data from the electric motor 2, or proximity detection systems. When the robot 1 reaches a position where the rear electromagnetic coil 21 is within effective magnetic coupling distance of the stop sensor, the controller 5 may activate the rear electromagnetic coil 21 by supplying electrical current to the coil.

The rear electromagnetic coil 21, when energized, may generate a magnetic field that may extend toward the stop sensor and may attract the ferromagnetic member positioned within the stop sensor. The magnetic attraction force may increase as the distance between the rear electromagnetic coil 21 and the ferromagnetic member decreases, creating a progressively stronger pulling force as the robot 1 approaches the final stopping position. The ferromagnetic member within the stop sensor may respond to the magnetic field by moving toward the rear electromagnetic coil 21. This movement may trigger a stopping mechanism that causes the electric motor 2 to halt. In some embodiments, the movement of the ferromagnetic member may actuate a switch or sensor within the stop sensor that sends a stop signal to the controller 5. Upon receiving the stop signal, the controller 5 may immediately send a halt command to the electric motor 2, cutting power to the motor and engaging any braking mechanisms that may be present.

In alternative embodiments, the movement of the ferromagnetic member may directly interrupt an electrical circuit that supplies power to the electric motor 2, causing the motor to stop without requiring an intermediate signal to the controller 5. This direct interruption mechanism may provide faster stopping response and may serve as a fail-safe mechanism that operates independently of the controller 5 processing.

The magnetic attraction between the rear electromagnetic coil 21 and the ferromagnetic member may also provide a holding force that maintains the robot 1 in the stopped position. The holding force may prevent the robot 1 from drifting or moving due to vibrations, slight track inclines, or other environmental factors. The controller 5 may maintain electrical current to the rear electromagnetic coil 21 during the connection and fire suppression operations to ensure the robot 1 remains precisely positioned at the electric valve 15 location.

The precise stopping mechanism may ensure that the robot 1 stops with the lower extinguishing hose outlet aligned with the electric valve 15 inlet. The alignment accuracy achieved through the electromagnetic stopping system may be within tolerances of 1-5 millimeters, enabling reliable mechanical and electrical connection between the hose and valve components. The repeatable positioning accuracy may ensure that the sealant 18 forms a proper seal, the electrical communication port 16 makes reliable electrical contact, and the fluid pathway between the extinguishing materials supply pipe 17 and the fire pump is properly established.

After the fire suppression operation is complete and the robot 1 is ready to move to another location, the controller 5 may deactivate the rear electromagnetic coil 21 by cutting electrical current to the coil. The cessation of magnetic attraction may allow the ferromagnetic member to return to its neutral position within the stop sensor, releasing the robot 1 from the stopped position. The return spring 13 may simultaneously retract the lower extinguishing hose to its ascending position, disconnecting the hose from the electric valve 15. With the stopping mechanism released and the hose retracted, the robot 1 may be free to resume movement along the rail track system to respond to other fire incidents or to continue monitoring operations.

When fire presence is confirmed through the verification process, the controller 5 may execute navigation algorithms that calculate the optimal route from the current robot 1 position to the fire location. The navigation algorithms may consider multiple factors including the shortest path to the nearest electric valve 15, wind direction data from the wind direction sensor 4, and environmental conditions that may affect fire suppression effectiveness. The controller 5 may determine the most appropriate stopping position relative to the fire location, ensuring that the robot 1 is positioned upwind from the fire to enable extinguishing materials to be carried toward the fire rather than dispersed away from the target area.

The robot 1 may begin movement toward the calculated fire location using the electric motor 2 and driving wheel system to traverse the rail tracks. During transit to the fire location, the thermal imaging camera 20 may continue monitoring the fire conditions and may analyze the developing fire characteristics to prepare for appropriate suppression actions. The controller 5 may simultaneously establish communication with emergency response centers to report the fire incident and initiate live video broadcasting of the event through the thermal imaging camera 20 and associated camera systems. In some embodiments, the robot 1 may contact the emergency center to report the fire and open a live broadcast through the thermal imaging camera 20 and allow specialists to control the robot 1 remotely to extinguish the fire.

Upon approaching the target fire location, the robot 1 may reduce movement speed to enable precise positioning at the designated stopping coordinates. The rear electrical coil 21 may interact with stop sensors positioned along the track to achieve accurate stopping at the electric valve 15 location nearest to the fire. In some embodiments, when approaching the electric valve 15, the robot 1 may travel slowly, and as soon as it approaches the stop sensors 36, the rear electrical coil 21 may attract the iron piece 35 inside the sensor, causing the electric motor 2 to stop and the robot 1 to stop at the precise location. The precise stopping mechanism may ensure that the robot 1 is positioned correctly for connection to the appropriate extinguishing materials supply line and optimal deployment of fire suppression materials.

The thermal imaging camera 20 may conduct detailed analysis of the fire characteristics including flame patterns, smoke behavior, heat intensity, and fire spread rate to determine the classification of the fire type. The computer vision algorithms within the controller 5 may compare the observed fire characteristics with stored fire classification data to identify whether the fire involves ordinary combustibles, flammable liquids, electrical equipment, metals, or cooking materials. The fire classification analysis may enable the controller 5 to select the most appropriate extinguishing material from the available options including water, foam, dry chemical powders, or gaseous suppression agents.

Based on the fire type determination, the controller 5 may select the appropriate extinguishing material and may activate the electromagnetic coil 11 associated with the corresponding extinguishing materials supply line. The electromagnetic coil 11 may attract the iron chip 12 within the selected lower extinguishing hose, causing the hose to move downward against the return spring 13 force and establish connection with the electric valve 15. In some embodiments, due to the attraction forces, the hose may be connected to the electric valve 15, and immediately the electrical communication port 16 may connect to the electrical outlet of the valve and supply it with electricity, causing the electric valve 15 to open and allow the material to pass from the pipes to the pump. The electrical communication port 16 may supply electrical power to the electric valve 15 upon connection, causing the valve to open and enable extinguishing material flow from the supply pipe to the connected fire pump.

The selected fire pump may begin operation to draw extinguishing material from the supply system and pressurize the material for delivery to the spray nozzles. In some embodiments, once the material reaches the pump, it may operate to pump it through the pipes to the spray nozzles a7 and b7. The controller 5 may activate the steering motors a8 and b8 to direct the spray nozzles toward the fire hotspot identified by the thermal imaging camera 20 analysis. The spray nozzle positioning may be continuously adjusted based on real-time thermal imaging data to maintain focus on the primary fire source and adapt to changes in fire behavior during the suppression process.

The controller 5 may monitor the effectiveness of the fire suppression process through continuous thermal imaging analysis and may adjust pumping pressure, spray nozzle direction, or material flow rate based on the observed fire response. If the fire intensity does not decrease as expected, the controller 5 may automatically modify the suppression approach by changing spray angles, increasing material flow, or selecting alternative extinguishing materials if multiple supply lines are available at the robot 1 location.

Remote operators at emergency response centers may monitor the fire suppression process through the live video feed and may assume manual control of the robot 1 operations if needed. The remote control capabilities may enable operators to override autonomous decisions and manually direct the spray nozzle positioning, material selection, or robot 1 movement based on their assessment of the fire conditions and suppression effectiveness.

For installations covering large location areas, multiple robots may be deployed to provide comprehensive fire protection coverage throughout the extended facility. Each robot may be programmed with defined operational boundaries that establish the specific area or zone for which that robot is responsible. The controller 5 of each robot may store digital mapping data that defines the operational boundaries and prevents the robot from operating outside its designated area, ensuring coordinated coverage without operational conflicts between multiple robots.

The operational boundaries for each robot may be determined based on the physical layout of the facility, the distribution of fire sensors 37, the locations of extinguishing materials supply lines, and the coverage capabilities of individual robots. The boundary definitions may ensure that all areas within the facility are covered by at least one robot while preventing overlapping operational zones that could result in multiple robots responding to the same fire incident.

When multiple robots are deployed, the fire detection and response system may include coordination algorithms that manage the response of multiple robots to fire incidents that occur near operational boundary areas. The coordination algorithms may determine which robot is best positioned to respond to a particular fire based on proximity, available extinguishing materials, and current operational status. The coordination system may prevent multiple robots from simultaneously responding to the same fire incident while ensuring that backup response capabilities are available if the primary responding robot encounters operational difficulties.

The scalable deployment approach may enable the fire suppression system to be customized for facilities of varying sizes and complexity levels. Small facilities may utilize a single robot with operational boundaries encompassing the entire monitored area, while large facilities may deploy multiple robots with carefully defined operational zones that provide comprehensive coverage. The modular nature of the system may allow additional robots to be added to existing installations as facility requirements change or as monitored areas are expanded.

Each robot in a multiple-robot deployment may maintain independent operational capabilities while participating in the coordinated fire response system. The individual robots may conduct autonomous fire detection, analysis, and suppression activities within their designated operational boundaries while communicating with the central coordination system to report status, share fire incident data, and coordinate response activities when fires occur near boundary areas between different robot operational zones.

The fire extinguishing robot may implement artificial intelligence and machine learning technologies through a set of integrated algorithms that enable the system to operate intelligently and efficiently. The algorithms may be divided into sequential stages that reflect the complete workflow of the robot 1, allowing autonomous decision-making based on input from sensors and pre-programmed information. In some embodiments, these components may work together in an integrated manner, enabling the controller 5 to control the electric motor 2 to move to the fire location and direct the spray nozzles using the steering motors a8 and b8, as well as activating the electromagnetic coil 11 to connect with the electric valve 15 to pump the extinguishing material through the pumps and hoses, thus achieving a rapid response and reciprocating movement to predict and extinguish fires with various options for extinguishing materials.

The controller 5 may implement an environment mapping and initial learning algorithm that configures the robot 1 to operate in its defined environment. The algorithm may receive data from the fire sensors 37, the thermal imaging camera 20, and site mapping information to create an intelligent digital map. During an initial learning phase, the robot 1 may traverse its entire path to record precise coordinates of each fire sensor 37 and their identification numbers, each electric valve 15 and associated extinguishing material type, locations of sensitive electrical equipment, and precise stopping points associated with each valve. The algorithm may build a virtual model of the site that links each sensor to the nearest valve and determines optimal travel paths. The algorithm may also record normal environmental conditions including baseline temperatures and lighting patterns using the thermal imaging camera 20 to establish reference data for detecting anomalies.

The controller 5 may implement a fire detection and verification algorithm that confirms the presence of fire conditions and accurately locates fire incidents. Upon receiving a signal from a fire sensor 37, the controller 5 may execute a verification process to avoid false alarm responses. The algorithm may request data from fire sensors 37 located near the suspected fire location to corroborate the initial alarm signal. The thermal imaging camera 20 may be directed toward the suspected coordinates to conduct thermal analysis and confirm the presence of genuine fire patterns that distinguish actual fire conditions from false alarms caused by equipment heat, lighting changes, or environmental factors. Once fire presence is confirmed, the algorithm may determine precise fire coordinates based on the location of the sensor that transmitted the alarm signal and the stored site map.

The controller 5 may implement an intelligent navigation and routing algorithm that guides the robot 1 to fire locations via optimal routes. The algorithm may receive fire coordinates, wind direction data from the wind direction sensor 4, and digital map information to calculate control commands for the electric motor 2. The algorithm may calculate the optimal path from the current robot 1 position to the nearest electric valve 15, considering any obstacles or constraints. Wind direction data may be incorporated to calculate the final stopping position, ensuring that the robot 1 is positioned upwind from the fire to enable extinguishing materials to be carried toward the fire rather than dispersed away from the target area. The robot 1 may move along the calculated path while correcting its trajectory in real-time if necessary, and may activate the precise stopping mechanism upon approaching the target location.

The controller 5 may implement a fire analysis and classification algorithm that determines fire type and selects appropriate extinguishing materials. The algorithm may process video footage and thermal data from the thermal imaging camera 20 using computer vision models that have been pre-trained on thousands of thermal images of different fire types. The algorithm may isolate the fire area within thermal images and may enhance image quality for analysis. Feature extraction processes may analyze flame color, smoke patterns, heat intensity, and fire spread rate. The classification process may compare extracted features with stored fire classification data to determine fire type, which may include Class A ordinary combustible fires, Class B flammable liquid fires, Class C electrical fires, Class D metal fires, or Class K cooking fires. Based on the fire type determination, the algorithm may select the appropriate extinguishing material from available options including water, foam, dry chemical powders, or gaseous suppression agents.

The controller 5 may implement an execution and operation algorithm that performs fire suppression operations. The algorithm may receive fire classification decisions and extinguishing material selections to generate operating commands for the fire pumps, electric valves 15, and electromagnetic coils. The algorithm may send commands to the electromagnetic coil 11 to establish connection with the electric valve 15 that supplies the selected extinguishing material. The appropriate fire pump may be activated and the electric valve 15 may be opened to allow passage of extinguishing material. The steering motors a8 and b8 may be controlled to precisely direct the spray nozzles toward fire hotspots based on continuous thermal imaging camera 20 analysis. The algorithm may monitor the effectiveness of the suppression process and may automatically adjust spray angles or pumping rates if fire intensity does not decrease as expected.

The controller 5 may implement a precise stopping algorithm that ensures accurate positioning at valve connection points. Upon approaching target coordinates, the algorithm may automatically reduce electric motor 2 speed. When stop sensors detect the robot 1's proximity, the controller 5 may send a short electrical pulse to the rear electrical coil 21 to attract the iron piece within the stop sensor, which opens the electrical circuit and causes the electric motor 2 to halt at the precise stopping position. The stopping position may be permanently associated with the electric valve 15 location to enable proper connection between the lower extinguishing hose and the valve.

The controller 5 may implement a precise stopping algorithm that ensures accurate positioning at valve connection points. The precise stopping algorithm may receive input data from multiple sources including position sensors, the electric motor 2 encoder, predetermined coordinate data stored in the controller 5 memory, and proximity detection systems that identify the approach to stop sensor locations. Upon approaching target coordinates, the algorithm may calculate the optimal deceleration profile based on the current speed of the robot 1, the distance remaining to the stop sensor, and the desired stopping accuracy. The algorithm may automatically reduce electric motor 2 speed according to the calculated deceleration profile, ensuring smooth and controlled approach to the stopping position. The speed reduction may occur in stages, with an initial reduction to moderate speed when the robot 1 is within a first predetermined distance of the stop sensor, followed by further reduction to slow speed when within a second, shorter predetermined distance.

When stop sensors detect the robot 1's proximity, the controller 5 may activate the rear electromagnetic coil 21 by sending electrical current to the coil windings. The activation timing may be precisely controlled to ensure the rear electromagnetic coil 21 is energized when the coil is within effective magnetic coupling distance of the ferromagnetic member within the stop sensor. In some embodiments, the controller 5 may send a short electrical pulse to the rear electromagnetic coil 21 to initiate magnetic attraction. In other embodiments, the controller 5 may supply continuous electrical current to the rear electromagnetic coil 21 throughout the stopping and connection process.

The rear electromagnetic coil 21, when energized, may attract the ferromagnetic member, which may be an iron piece 35, positioned within the stop sensor. The magnetic attraction may cause the ferromagnetic member to move toward the rear electromagnetic coil 21. This movement may trigger a stopping mechanism that causes the electric motor 2 to halt at the precise stopping position. In some embodiments, the movement of the ferromagnetic member may open an electrical circuit that interrupts power to the electric motor 2, causing immediate motor cessation. In other embodiments, the movement may actuate a sensor that sends a stop signal to the controller 5, which then commands the electric motor 2 to halt.

The stopping position may be permanently associated with the electric valve 15 location to enable proper connection between the lower extinguishing hose and the valve. The permanent association may be established during the initial environment mapping phase when the robot 1 traverses its entire path and records the precise coordinates of each stop sensor and its corresponding electric valve 15. The stored coordinate data may ensure that each stop sensor location corresponds to an optimal position for hose-valve connection.

The precise stopping algorithm may achieve positioning accuracy within tight tolerances, enabling reliable mechanical coupling, electrical connection, and fluid sealing between the lower extinguishing hose and the electric valve 15. The electromagnetic attraction mechanism may provide superior positioning accuracy compared to purely distance-based or time-based stopping methods, as the physical magnetic force creates a definite and repeatable stopping point. The algorithm may also include error detection and correction capabilities that identify if the robot 1 has not stopped at the correct position and may execute corrective movements to achieve proper alignment before attempting hose-valve connection.

The controller 5 may implement a communication and coordination algorithm that integrates autonomous operations with remote human control capabilities. The controller 5 may incorporate machine learning capabilities that learn normal readings for the monitored site and identify irrational deviations that may indicate developing fire conditions or equipment malfunctions. Upon fire confirmation, the algorithm may automatically transmit notifications to emergency response centers. A communication channel may be opened to broadcast live video of the incident while displaying fire data including type, location, and selected extinguishing material. Remote control interfaces may provide operators with options to approve autonomous decisions or to assume manual control of spray nozzle direction, material type selection, or system operations.

The controller 5 may incorporate machine learning capabilities that enable continuous performance improvement through data collection and analysis. The machine learning algorithms may collect data from each fire incident including the effectiveness of different extinguishing materials against specific fire types and fire spread patterns at particular locations. The algorithms may analyze this historical data to improve decision accuracy in future fire response operations. The controller 5 may learn normal temperature readings and environmental conditions for the monitored site and may identify anomalous temperature variations that may indicate developing fire conditions or equipment malfunctions before ignition occurs.

In some embodiments, the robot for extinguishing fires in open and extended locations may comprise a housing that may be detachable and re-installable. The housing may have a cube-shaped configuration and may be constructed from materials including metal, plastic, or reinforced carbon fiber. The housing may be supported by a rack structure 23 that may be configured in an L-shaped profile. The rack structure 23 may serve as a supporting structure from the interior of the housing and may extend behind the housing to the exterior. The rack structure 23 may be hollowed internally to facilitate the routing of electrical wires 31 and electrical wires 32 through the interior spaces.

The housing may contain an electric motor 2 that may be connected to a driving wheel a3 from a rear portion to control movement of the robot. The electric motor 2 may be connected from a bottom portion to two driven wheels, specifically driven wheel b3 and driven wheel c3, which may be configured to move freely in forward and backward directions. The driven wheels may travel according to the movement of the driving wheel a3, which may engage with an upper rail track a25. The driven wheels may engage with a lower rail track b25. Both rail tracks may be constructed from metal materials.

At the top of the housing exterior, a wind direction sensor 4 may be positioned to monitor environmental wind conditions. A controller 5 may also be positioned at the top of the housing and may comprise a thermal imaging camera 20. A flashlight 6 may be positioned adjacent to the thermal imaging camera 20. On both the right and left sides of the housing, spray nozzles may be positioned, including spray nozzle a7 and spray nozzle b7. The number of spray nozzles may be increased when operational requirements necessitate additional coverage.

The spray nozzles may be equipped with steering motors positioned at their bottom portions. Steering motor a8 may be associated with spray nozzle a7, and steering motor b8 may be associated with spray nozzle b7. The steering motors may be wired to the controller 5 and may be configured to be steered automatically through controller commands or remotely through operator input transmitted to the controller 5.

Two fire pumps may be positioned inside the housing, including fire pump a9 and fire pump b9. The number of fire pumps may be increased when operational requirements necessitate additional pumping capacity. The fire pumps may vary in terms of their manufacturing components, and the specific manufacturing components may determine the type of extinguishing material that each pump may be configured to handle.

Lower extinguishing hoses may be configured in a T-shaped profile and may include first lower extinguishing hose a10 and second lower extinguishing hose b10. The lower extinguishing hoses may be constructed from metal or plastics and their derivatives. The manufacturing materials may be selected to suit the properties of the fire suppression material that may be used with each hose. An iron chip 12 may be installed at the bottom interior portion of each lower extinguishing hose. An electromagnetic coil 11 may be positioned opposite to the iron chip 12 at the bottom of the housing. The electromagnetic coil 11 may be installed on the wall of the lower housing portion and may be wired to the controller 5. The electromagnetic coil 11 may receive electrical power from feed outlets 33.

The electromagnetic coil 11 may operate to control the downward movement of the lower extinguishing hoses. The natural position of the hoses may be in an ascending orientation, which may be maintained by a return spring 13.

The outlets of the lower hoses may be configured to coalesce with electric valves 15 during operation, forming a unified assembly through attraction forces. A sealant 18 may be positioned at the connection interface to ensure complete sealing. An electrical communication port 16 may be connected to the hose outlets from the exterior and may operate upon coalescence to supply the electric valves 15 with electrical current.

Flexible pipes may connect the fire pumps to the lower extinguishing hoses. Flexible pipe a19 and flexible pipe b19 may be constructed from metal or plastics and their derivatives. The flexible pipes may be connected from their bottom portions to the respective fire pumps.

A rear electrical coil 21 may be positioned at the rear portion of the robot. The operation of the rear electrical coil 21 may be controlled by the controller 5. When the robot approaches a desired electric valve position, the robot may travel at reduced speed until the rear electrical coil 21 is positioned facing a free iron piece 35, at which point the robot may stop.

These components may work together in an integrated manner to enable the controller 5 to control the electric motor 2 for movement to fire locations. The controller 5 may direct the spray nozzle a7 and spray nozzle b7 using the steering motor a8 and steering motor b8. The controller 5 may activate the electromagnetic coil 11 to establish connection with the electric valve 15, enabling the pumping of extinguishing material through the fire pump a9 and fire pump b9 and through the first lower extinguishing hose a10 and second lower extinguishing hose b10. This integrated operation may achieve rapid response and reciprocating movement capabilities for predicting and extinguishing fires with various options for extinguishing materials.

In some embodiments, a method for installing a robot for extinguishing fires in open and extended locations may include several operational steps. The system may contain fire sensors 37 that may be deployed at the monitored location. The fire sensors 37 may be connected to the robot through wired or wireless communication links. When a fire hazard occurs, the fire sensors 37 may send a call signal to the robot. The robot may proceed to the fire location based on predetermined coordinates according to programmed instructions. The robot may navigate to the nearest electric valve 15 located near the fire after considering wind direction data from the wind direction sensor 4. The thermal imaging camera 20 located on top of the robot and connected to the controller 5 may analyze the pattern and form of smoke, fire characteristics, and changes in the surrounding environment. The analysis may determine the location of the fire, the type of equipment that may be damaged, and the most appropriate extinguishing material to address the fire conditions.

During the fire response process, the robot may contact an emergency response center to report the fire incident. The robot may open a live broadcast transmission through the thermal imaging camera 20 and may allow specialists at the emergency response center to control the robot remotely to conduct fire suppression operations.

The robot may be pre-programmed with autonomous response capabilities that may activate in case of non-response from remote operators. The autonomous programming may enable the robot to select the appropriate extinguishing material and initiate fire suppression operations without human intervention.

After determining the type of fire and the extinguishing material required for suppression, the controller 5 may send a wired signal to the electromagnetic coil 11 that may be associated with the supply track of the specified fire extinguishing material. The electromagnetic coil 11 may attract the iron chip 12 positioned within the lower extinguishing hose. Due to the attraction forces, the lower extinguishing hose may be connected to the electric valve 15. The electrical communication port 16 may connect to the electrical outlet of the electric valve 15 and may supply electrical current to the valve. The electric valve 15 may open in response to the electrical supply, allowing extinguishing material to pass from the extinguishing materials supply pipe 17 to the fire pump.

Once the extinguishing material reaches the fire pump, the pump may operate to pump the material through the flexible pipes to the spray nozzle a7 and spray nozzle b7. The controller 5 may control the pumping power and may direct the steering motor a8 and steering motor b8 to position the spray nozzles. The steering control may be accomplished through orientation based on artificial intelligence technologies, or through remote orientation by contacting the emergency response center. After reporting the fire and live broadcasting the event through the thermal imaging camera 20, specialists at the emergency response center may control the steering remotely.

The operational steps may be carried out in the sequence described to achieve a complete working mechanism that may enable the robot to respond quickly and accurately to fire incidents. The method may enable control of the extinguishing process remotely or automatically using artificial intelligence technologies.

In some embodiments, a method for installing a robot for extinguishing fires in open and extended locations may configure the robot to move along a fixed reciprocating track. The upper rail track a25 may be disposed on the pipe rack 24. The pipe rack 24 may be hung on wall brackets 29 that may be fixed to wall structures. Alternatively, the pipe rack 24 may be disposed on column racks through an installation guide 34. The installation guide 34 may enable the vertical levels of the pipe rack 24 to be controlled upward and downward according to the position of devices or equipment at the monitored locations. The pipe rack 24 may comprise mounting positions for fire sensors 37. The fire sensors 37 may include flame probes, miniature thermal cameras, smoke sensors, or temperature sensors. The number of fire sensors 37 may be determined or increased according to the area of the location and according to operational needs to ensure coverage of all corners and destinations within the monitored area.

This installation arrangement may ensure the configuration of a suitable environment for the robot to operate. The installation may enable the robot to monitor continuously around the clock and may allow the robot to move freely and flexibly along the predetermined path to reach any fire location in the open or extended area.

In some embodiments, a method for installing a robot for extinguishing fires in open and extended locations may include the installation of extinguishing materials supply pipes. The pipes may be constructed from plastic or metal materials and may be located on the pipe rack 24. The beginning portions of the pipes may be connected to tanks containing extinguishing materials. The end portions of the pipes may be closed and may comprise a number of electric valves 15. The electric valves 15 may operate with screw actuators and may be similar to valves known as solenoid valves. The electric valves 15 may be manufactured with specifications that correspond to the sizes of the lower extinguishing hoses. The locations of the electric valves 15 may be determined and their number may be increased based on the conditions of the monitored location. Each pipe track may be manufactured in proportion to the characteristics of the fire suppression material that may be used in that particular supply line.

This installation configuration may allow for the provision of supply lines for various extinguishing materials including water, foam, gases, and powders to the same operational path. The installation may enable the robot to select the appropriate extinguishing material and connect directly to the relevant electric valve 15.

In some embodiments, a method for installing a robot for extinguishing fires in open and extended locations may include the installation of an electrical supply system. The main supply track 40 may be constructed from aluminum and may extend along the length and extension of the rail track. The main supply track 40 may comprise inverted internal tracks that may represent electrodes. The electrodes may serve as electrical outlets that may be connected to supply tracks that move with the robot. The end portions of electrical wires may be fixed to the robot to enable continuous electrical supply. The robot may be supplied with electricity through electricity supply point 28, which may pass electrical current through a set of wires 27 until the current reaches the main branch 26. The electrical current may continue to the supply points of the robot components, including electrical wires 31 and feed outlets 33.

The terminal ends of the wires 27 may be connected to the main supply track 40 through electrodes 41 that may be fixed to the main supply track 40 by fixing screws 42. Each electrical phase may have a specific pole to maintain proper electrical separation. The robot may remain in continuous electrical supply mode, with electricity available along the length and extension of the rail track. The electrical branch of the robot may comprise flexible moving contact heads 39 that may move with the robot. Insulators 38 may be connected to the flexible moving contact heads 39 from the bottom to achieve the required dielectric separation between the electrical poles.

To achieve stability in electrical conductivity when the fire pumps operate, the controller 5 may send a command to electromagnetic coil 45 to attract the contacts base 44 downward. The flexible moving contact heads 39 may be attracted downward with the contacts base 44. This mechanism may seal the contact points to prevent loosening of the electrical contacts during the electrical supply to the fire pumps.

This installation configuration may allow for continuous and reliable power supply to the robot while the robot is moving, standing still, and operating its high-consumption fire pumps. The electrical supply system may enable the robot to operate around the clock without interruption and in all environmental conditions.

In some embodiments, a method for installing a robot for extinguishing fires in open and extended locations may include a precise stopping mechanism. The robot may be configured to stop according to correct coordinates while achieving complete stability and preventing stopping at incorrect locations. When the robot approaches an electric valve 15, the robot may travel at reduced speed. As soon as the robot approaches stop sensors 36, the rear electrical coil 21 may attract the iron piece 35 inside the stop sensor. The attraction of the iron piece 35 to the rear electrical coil 21 may cause the electric motor 2 to stop, resulting in the robot stopping at the precise location. The position of the iron piece 35 may be permanently associated with the position of the electric valve 15.

This stopping mechanism may ensure that the robot stops precisely when conducting fire suppression operations at the predetermined point associated with the location of the electric valve 15. The precise stopping may enable a complete and tight connection between the lower extinguishing hose and the electric valve 15. The mechanism may prevent the robot from stopping at an incorrect location that would hinder the fire suppression process.

A number of implementations have been described. Nevertheless, it will be understood that various modifications may be made without departing from the spirit and scope of the disclosure. Accordingly, other implementations are within the scope of the following claims.

The invention claimed is:

1. A robot for extinguishing fires in open and extended locations, comprising:
- a housing;
- a rack structure positioned within the housing and extending outside the housing;
- an electric motor positioned inside the housing;
- a driving wheel connected to the electric motor;
- two driven wheels positioned at the housing;
- an upper rail track and a lower rail track configured to support the driving wheel and the driven wheels respectively;
- a controller;
- a thermal imaging camera operatively coupled to the controller and configured to analyze fire patterns using artificial intelligence;
- a wind direction sensor;
- at least one spray nozzle;
- at least one steering motor connected to the at least one spray nozzle and operatively coupled to the controller;
- at least one fire pump positioned inside the housing;
- at least one lower extinguishing hose connected to the at least one fire pump;
- a metal chip installed in the at least one lower extinguishing hose;
- an electromagnetic coil positioned to attract the metal chip and operatively coupled to the controller;
- a return spring associated with the at least one lower extinguishing hose to maintain the hose in a retracted position;
- an electric valve configured to interface with the at least one lower extinguishing hose when the electromagnetic coil attracts the metal chip;
- an electrical communication port positioned at a connection interface between the at least one lower extinguishing hose and the electric valve; and
- an extinguishing materials supply pipe connected to the electric valve.

2. The robot of claim 1, wherein the housing comprises a cube-shaped box with detachable and re-installable faces.

3. The robot of claim 2, wherein the housing is constructed from a material selected from the group consisting of metal, plastic, and reinforced carbon fiber.

4. The robot of claim 1, wherein the rack structure has an L-shaped configuration and is hollowed internally to facilitate routing of electrical wires.

5. The robot of claim 1, further comprising a flashlight positioned adjacent to the thermal imaging camera.

6. The robot of claim 5, further comprising a rain scanner configured to clean glass surfaces of the thermal imaging camera and the flashlight.

7. The robot of claim 1, wherein the at least one spray nozzle comprises two spray nozzles positioned on opposite sides of the housing, and the at least one steering motor comprises two steering motors each connected to a respective spray nozzle.

8. A method for operating a robot for extinguishing fires in open and extended locations, comprising:

detecting a fire hazard using fire sensors deployed at a location;

sending a call signal from the fire sensors to a robot positioned on a rail track system;

moving the robot along the rail track system to a fire location using an electric motor and driving wheel;

analyzing fire patterns and environmental conditions using a thermal imaging camera with artificial intelligence capabilities;

determining a type of fire and selecting an appropriate extinguishing material based on the analysis;

activating an electromagnetic coil to attract a metal chip in a selected lower extinguishing hose, causing the hose to move downward and connect with an electric valve;

supplying electrical power to the electric valve through an electrical communication port to open the valve;

pumping extinguishing material from an extinguishing materials supply pipe through the electric valve to at least one fire pump;

directing the extinguishing material to at least one spray nozzle using the at least one fire pump; and controlling a direction of the at least one spray nozzle using at least one steering motor to target the fire location.

9. The method of claim 8, further comprising a step of establishing wireless communication with an emergency response center to report the fire incident.

10. The method of claim 9, further comprising a step of opening a live video broadcast of the fire suppression operation through the thermal imaging camera.

11. The method of claim 8, further comprising a step of monitoring wind direction using a wind direction sensor and positioning the robot upwind from the fire location.

12. The method of claim 11, wherein the step of positioning the robot comprises calculating an optimal stopping position that accounts for wind direction to ensure extinguishing materials are carried toward the fire.

13. The method of claim 8, further comprising a step of verifying the fire detection by requesting additional data from fire sensors located near the suspected fire location before moving the robot.

14. The method of claim 8, wherein the step of analyzing fire patterns comprises using computer vision algorithms to determine fire characteristics including flame color, smoke pattern, heat intensity, and spread rate to classify the fire type.

15. A rail-mounted fire suppression system for extended locations, comprising:

a pipe rack having an L-shaped profile and configured to support rail tracks and extinguishing material supply infrastructure;

an upper rail track and a lower rail track mounted on the pipe rack;

a robot configured to travel on the upper rail track and the lower rail track;

multiple fire sensors distributed along the pipe rack and configured to detect fire conditions;

multiple electric valves positioned at intervals along an extinguishing materials supply pipe mounted on the pipe rack;

a main supply track extending along a length of the pipe rack and configured to provide continuous electrical power;

flexible moving contact heads on the robot configured to maintain electrical contact with the main supply track during movement;

a controller on the robot configured to coordinate fire detection, analysis, and suppression operations using artificial intelligence; and a thermal imaging camera on the robot configured to analyze fire characteristics and determine appropriate suppression strategies.

16. The rail-mounted fire suppression system of claim 15, wherein the pipe rack is mounted using wall brackets configured to secure the pipe rack to facility wall structures.

17. The rail-mounted fire suppression system of claim 16, further comprising an installation guide configured to enable vertical adjustment of the pipe rack levels according to equipment positioning requirements.

18. The rail-mounted fire suppression system of claim 15, wherein the robot comprises:

a housing;

an electric motor positioned inside the housing and connected to a driving wheel that engages with the upper rail track;

two driven wheels that engage with the lower rail track; and at least one spray nozzle with at least one steering motor controlled by the controller.

19. The rail-mounted fire suppression system of claim 18, wherein the robot further comprises:

an electromagnetic coil configured to attract a metal chip in at least one lower extinguishing hose to establish connection with one of the multiple electric valves;

a return spring associated with the at least one lower extinguishing hose to maintain the hose in an ascending position when not connected; and an electrical communication port configured to supply electrical power to the electric valve upon connection.

20. The rail-mounted fire suppression system of claim 19, wherein the main supply track comprises electrodes secured with fixing screws, and the flexible moving contact heads are connected to a contacts base that is controlled by an electromagnetic coil to adjust contact pressure during high-power operations.

* * * * *